US012532806B2

United States Patent
Holman et al.

(10) Patent No.: US 12,532,806 B2
(45) Date of Patent: Jan. 27, 2026

(54) POWER TOOL AND COMPACT POWER FEED TRIMMER HEAD

(71) Applicant: Techtronic Cordless GP, Anderson, SC (US)

(72) Inventors: Christopher Holman, Clemson, SC (US); Scott Reed, Anderson, SC (US); Lance Eckard, Anderson, SC (US)

(73) Assignee: TECHTRONIC CORDLESS GP, Anderson, SC (US)

( * ) Notice: Subject to any disclaimer, the term of this patent is extended or adjusted under 35 U.S.C. 154(b) by 189 days.

(21) Appl. No.: 18/431,382

(22) Filed: Feb. 2, 2024

(65) Prior Publication Data
US 2024/0268260 A1   Aug. 15, 2024

Related U.S. Application Data

(60) Provisional application No. 63/530,590, filed on Aug. 3, 2023, provisional application No. 63/445,426, filed on Feb. 14, 2023.

(51) Int. Cl.
*A01D 34/416*   (2006.01)
(52) U.S. Cl.
CPC ................ *A01D 34/4162* (2013.01)
(58) Field of Classification Search
CPC .................. A01D 34/4162; A01D 34/416
See application file for complete search history.

(56) References Cited

U.S. PATENT DOCUMENTS

| 2,678,119 | A | * | 5/1954 | Birbaum | ................. F16D 43/10 |
| | | | | | 73/551 |
| 4,245,454 | A | | 1/1981 | Zien | |
| 4,310,970 | A | * | 1/1982 | Evenson | ............ A01D 34/4161 |
| | | | | | 30/276 |
| 4,390,089 | A | * | 6/1983 | Dalrymple | .............. F16D 43/22 |
| | | | | | 192/30 R |

(Continued)

FOREIGN PATENT DOCUMENTS

| CA | 2714878 C | 2/2013 |
| CN | 104663113 B | 8/2016 |

(Continued)

OTHER PUBLICATIONS

Partial European Search Report Corresponding to Application No. 24157441 on Aug. 6, 2024.

(Continued)

*Primary Examiner* — Sean M Michalski
(74) *Attorney, Agent, or Firm* — Dority & Manning, P.A.

(57) ABSTRACT

An accessory mount device for a power tool, wherein a reference axis forms an axis of rotation of the accessory mount device, the accessory mount device including a housing forming an interior volume, the housing including a ramped surface in the interior volume at which a bearing is positioned; a first plate forming a channel at which the bearing is positioned at the ramped surface to push the first plate along the reference axis; and a second plate configured to push a spool in the direction of the reference axis, wherein the bearing is configured to selectively push the first plate to the second plate when a centrifugal force threshold is exceeded, and wherein the second plate is allowed to rotate around the reference axis separate from the first plate.

20 Claims, 25 Drawing Sheets

(56) References Cited

U.S. PATENT DOCUMENTS

| | | | |
|---|---|---|---|
| 4,561,180 A * | 12/1985 | Pittinger, Sr. | A01D 34/4163 30/276 |
| 4,566,189 A * | 1/1986 | Muto | A01D 34/4162 30/276 |
| 4,599,796 A * | 7/1986 | Baba | A01D 34/4162 30/276 |
| 4,702,005 A * | 10/1987 | Pittinger, Sr. | A01D 34/4163 30/276 |
| 5,293,692 A * | 3/1994 | Sugihara | A01D 34/4161 30/276 |
| 5,855,068 A * | 1/1999 | Zilly | A01D 34/4162 30/276 |
| 5,881,464 A * | 3/1999 | Collins | A01D 34/4163 30/276 |
| 6,094,823 A * | 8/2000 | Brown | A01D 34/416 30/276 |
| 6,779,274 B2 | 8/2004 | Peterson et al. | |
| 6,901,667 B2 | 6/2005 | Proulx | |
| 6,944,954 B1 * | 9/2005 | Arnetoli | A01D 34/416 30/276 |
| 6,952,877 B2 | 10/2005 | Pfaltzgraff | |
| 7,275,324 B2 | 10/2007 | Proulx | |
| 7,513,046 B2 | 4/2009 | Proulx | |
| 7,581,322 B2 | 9/2009 | Proulx | |
| 7,823,291 B2 * | 11/2010 | Shibasaki | A01D 34/4162 30/276 |
| D653,920 S | 2/2012 | Cigarini | |
| 8,689,451 B2 | 4/2014 | Cigarini | |
| 9,380,743 B2 | 7/2016 | Alliss | |
| 9,516,807 B2 | 12/2016 | Alliss | |
| D796,293 S | 9/2017 | Alliss | |
| 9,861,033 B2 | 1/2018 | Skinner et al. | |
| 9,907,225 B2 | 3/2018 | Cigarini et al. | |
| 9,924,631 B2 * | 3/2018 | Alliss | A01D 34/4163 |
| 10,034,422 B2 | 7/2018 | Palermo | |
| D825,293 S | 8/2018 | Alliss | |
| 10,130,030 B2 | 11/2018 | Sprungman et al. | |
| 10,149,433 B2 | 12/2018 | Wyne | |
| 10,334,778 B2 | 7/2019 | Kullberg | |
| 10,537,057 B2 | 1/2020 | Sergyeyenko et al. | |
| 10,918,015 B2 * | 2/2021 | Hallendorff | A01D 34/4161 |
| 11,109,530 B2 | 9/2021 | Arnetoli | |
| 11,122,735 B2 * | 9/2021 | Cholst | A01D 34/4163 |
| 11,229,160 B2 | 1/2022 | Skinner | |
| 11,337,368 B2 | 5/2022 | Alliss | |
| 11,419,262 B2 | 8/2022 | Guo et al. | |
| 11,439,059 B2 | 9/2022 | Dai | |
| 11,452,258 B2 | 9/2022 | Zhang et al. | |
| D970,321 S | 11/2022 | Alliss | |
| 11,503,759 B2 | 11/2022 | Guo et al. | |
| 11,503,763 B2 | 11/2022 | Holman et al. | |
| 11,582,905 B2 | 2/2023 | Alliss | |
| 2007/0251101 A1 * | 11/2007 | Shibasaki | A01D 34/4162 30/276 |
| 2013/0145630 A1 | 6/2013 | Stones | |
| 2014/0325851 A1 | 11/2014 | Bone | |
| 2015/0223395 A1 | 8/2015 | Pellenc et al. | |
| 2016/0106034 A1 | 4/2016 | Arnetoli | |
| 2017/0215338 A1 * | 8/2017 | Arnetoli | A01D 34/4163 |
| 2017/0231153 A1 | 8/2017 | Hoffman | |
| 2018/0104809 A1 | 4/2018 | Dyer et al. | |
| 2020/0214202 A1 * | 7/2020 | Holman | A01D 34/733 |
| 2020/0236845 A1 | 7/2020 | Wang et al. | |
| 2021/0037704 A1 | 2/2021 | Kullberg | |
| 2021/0076564 A1 | 3/2021 | Guo | |
| 2022/0104430 A1 | 4/2022 | Guo | |
| 2022/0104431 A1 | 4/2022 | Guo | |
| 2022/0240445 A1 | 8/2022 | Hoffman et al. | |
| 2022/0330479 A1 | 10/2022 | Cholst et al. | |
| 2022/0377974 A1 | 12/2022 | Hoffman et al. | |
| 2022/0400609 A1 | 12/2022 | Guo et al. | |
| 2023/0000008 A1 | 1/2023 | Cholst | |
| 2023/0011491 A1 | 1/2023 | Levin et al. | |
| 2023/0157205 A1 | 5/2023 | Kullberg et al. | |

FOREIGN PATENT DOCUMENTS

| | | |
|---|---|---|
| CN | 206506877 U | 9/2017 |
| CN | 207022513 U | 2/2018 |
| CN | 207543609 U | 6/2018 |
| CN | 108617226 A | 10/2018 |
| CN | 106416588 B | 8/2019 |
| CN | 111937564 A | 11/2020 |
| CN | 112273035 A | 1/2021 |
| CN | 113179742 A | 7/2021 |
| CN | 115250721 A | 11/2022 |
| CN | 115486257 A | 12/2022 |
| CN | 218125533 U | 12/2022 |
| CN | 218897541 U | 4/2023 |
| CN | 219019570 U | 5/2023 |
| DE | 102007056319 A1 | 5/2009 |
| EP | 0140634 B1 | 5/1988 |
| EP | 0676126 B1 | 12/1998 |
| EP | 2107866 B1 | 6/2012 |
| EP | 2798935 B1 | 3/2018 |
| IT | 201800008009 A1 | 2/2020 |
| WO | WO2018/077231 A1 | 5/2018 |
| WO | WO2015172744 A1 | 5/2018 |
| WO | WO2019/192201 A1 | 10/2019 |
| WO | WO2022/218058 A1 | 10/2022 |

OTHER PUBLICATIONS

European Search Report Corresponding to Application No. 24157441 on Oct. 28, 2024.

\* cited by examiner

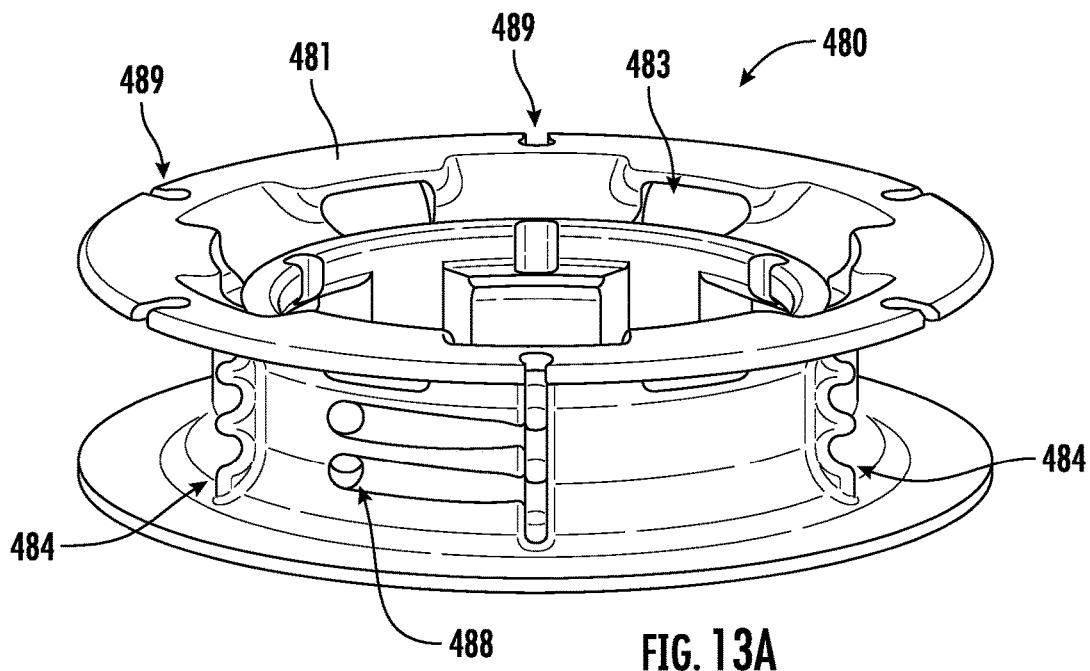
FIG. 13A
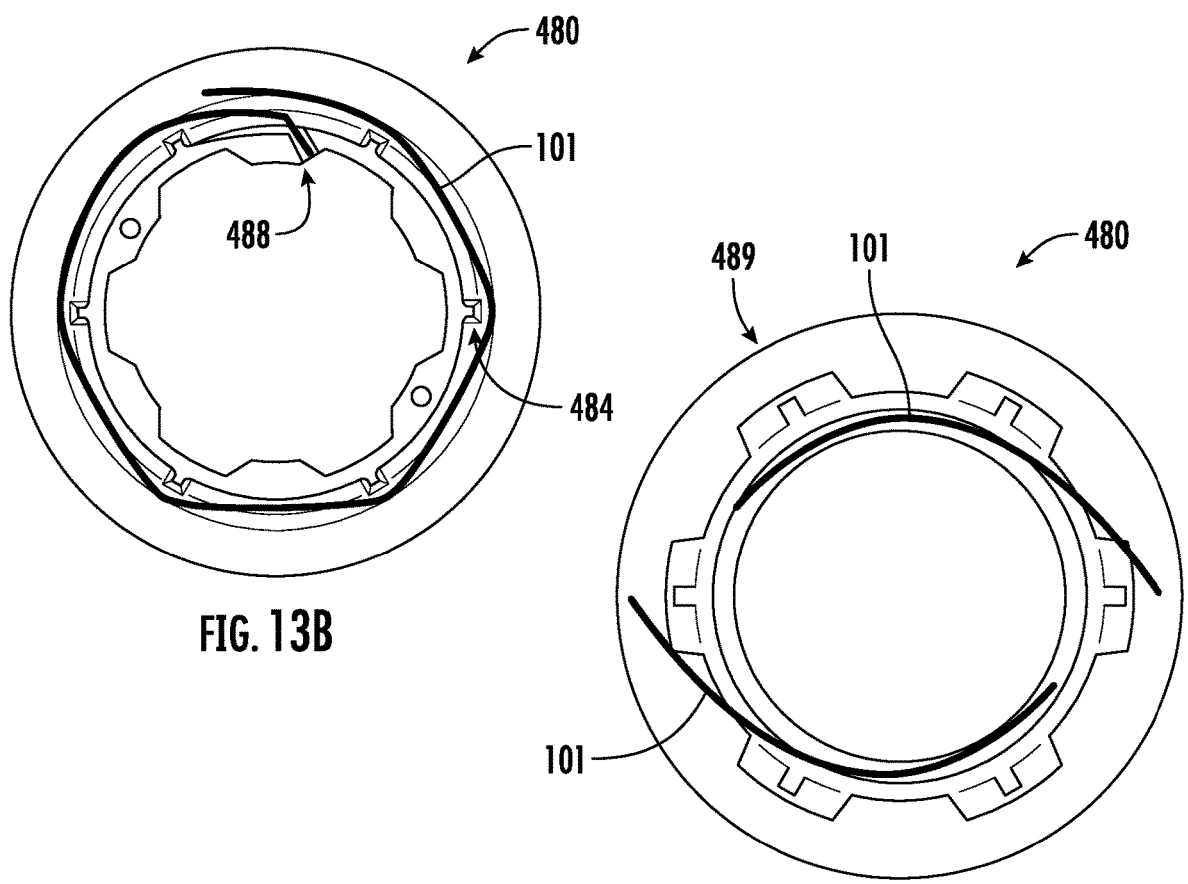
FIG. 13B
FIG. 13C

POWER TOOL AND COMPACT POWER FEED TRIMMER HEAD

CROSS-REFERENCE TO RELATED APPLICATIONS

The present application claims priority to U.S. Provisional Patent Application No. 63/445,426, filed on Feb. 14, 2023 and U.S. Provisional Patent Application No. 63/530,590, filed on Aug. 3, 2023, the disclosures of which are incorporated by reference herein in their entireties.

FIELD

The present disclosure generally pertains to power tools and accessory mounting devices.

BACKGROUND

Power tools are generally used to perform manual operations without requiring as much manual labor. For example, trimmers are utilized for trimming grass and weeds. Trimmers generally utilize trimmer line which is spun at high speeds to break the grass and weeds. However, the trimmer line is subject to damage over periods of use and may become broken or ineffective. Accordingly, operators must advance new trimmer line as the existing trimmer line becomes exhausted. Traditional assemblies utilize manual advancement or bump feeds which activate release of additional trimmer line when the power tool is bumped against a surface, e.g., the ground. This can cause damage to the power tool and is not a desirable method of advancing trimmer line.

Accordingly, improved trimmers and trimmer heads would be advantageous.

BRIEF DESCRIPTION OF THE INVENTION

Aspects and advantages of the invention will be set forth in part in the following description, or may be obvious from the description, or may be learned through practice of the invention.

An aspect of the present disclosure is directed to an accessory mount device for a power tool, wherein a reference axis forms an axis of rotation of the accessory mount device, the accessory mount device including a housing forming an interior volume, the housing including a ramped surface in the interior volume at which a bearing is positioned; a first plate forming a channel at which the bearing is positioned at the ramped surface to push the first plate along the reference axis; a second plate configured to push a spool in the direction of the reference axis, wherein the bearing is configured to selectively push the first plate to the second plate when a centrifugal force threshold is exceeded, and wherein the second plate is allowed to rotate around the reference axis separate from the first plate.

Another aspect of the present disclosure is directed to an accessory mount device for a power tool, wherein a reference axis forms an axis of rotation of the accessory mount device, the accessory mount device including a first plate forming a channel at which a bearing is positioned at a ramped surface to push a first plate along the reference axis; a second plate configured to push a spool along the reference axis; a housing surrounding the first and second plates; a carrier forming a bayonet type locking mechanism configured to align a lug at the spool with a channel at the carrier.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 13A provides a perspective view of an embodiment of a spool of an accessory device in accordance with aspects of the present disclosure.

FIG. 13B depicts an exemplary method for wrapping a trimmer line through an embodiment of the spool of the accessory device in accordance with aspects of the present disclosure.

FIG. 13C depicts an exemplary method for wrapping a trimmer line through an embodiment of the spool of the accessory device in accordance with aspects of the present disclosure.

Figure 1:
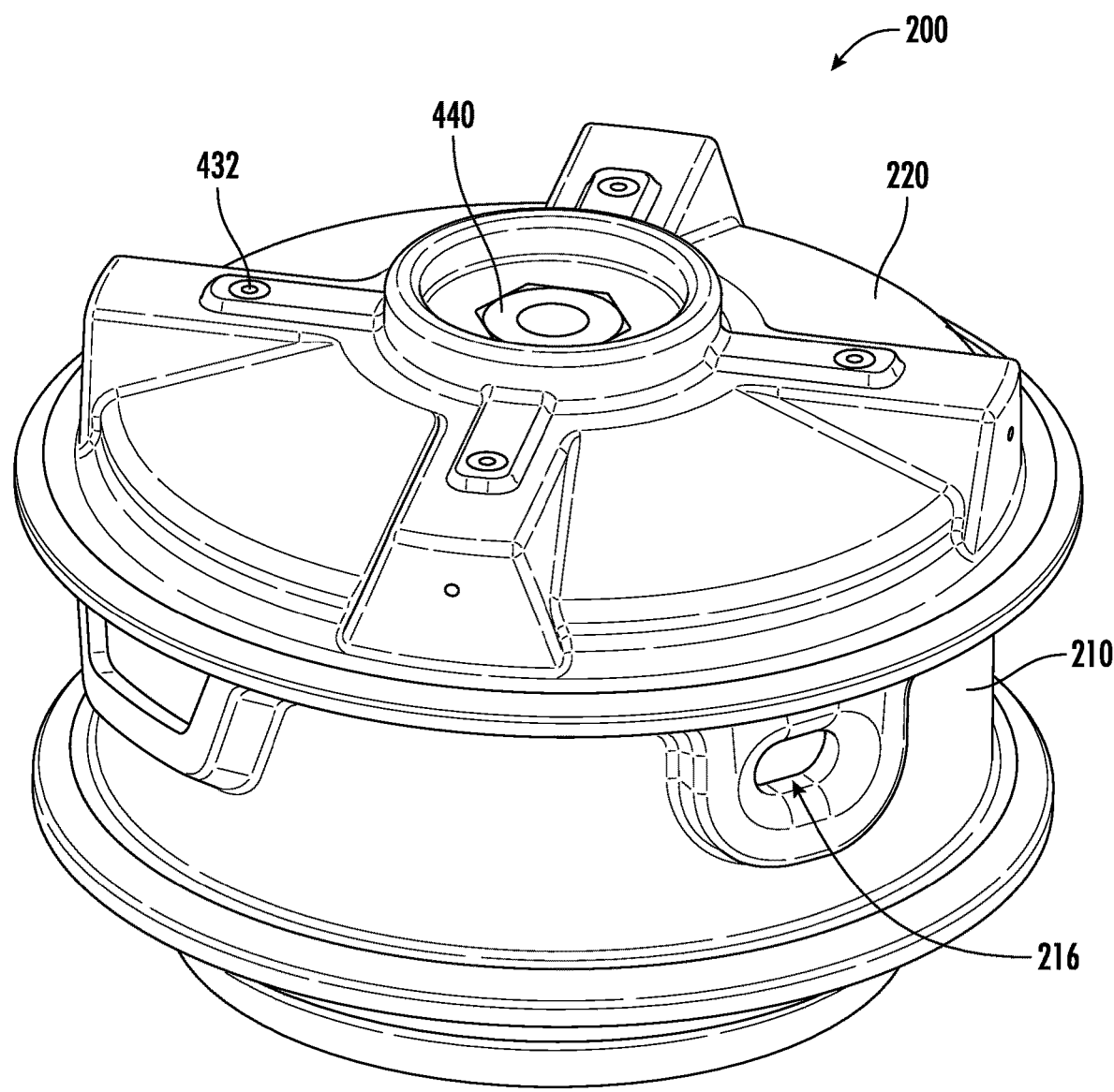
FIG. 1 provides a perspective view of an embodiment of an accessory device for a power tool in accordance with aspects of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

A significant issue that prevents successful feeding of a string head is the tendency for the cutting line to cross wrap. String trimmer lines get pulled tight from the centrifugal force exerted by the length of line extending out from the head. This force pulls the line tight and can cross wrap and bind the line.

Lifter apparatuses for trimmer devices can be difficult to manufacture, which increases the difficulty of tuning the lifter apparatus. For instance, some lifter devices may need to move at particular threshold speeds or with particular centrifugal forces to enact lifting or feeding of trimmer line.

The present disclosure is generally directed to improved power tools and accessory mount devices, such as trimmers and trimmer heads. Embodiments of trimmers and trimmer heads depicted and described herein such trimmer heads address one or more of the above-identified issues with some known trimmers. Embodiments of power tools such as provided herein may provide structures and methods for feeding trimmer line, structures for mounting a trimmer line spool, and structures and methods such as may mitigate damage to the power tool.

Embodiments of an accessory mount device are provided, such as depicted and described herein. Embodiments of methods for operating a power tool, an accessory mount device, such as to automatically feed or power feed a line, are further provided herein. Referring to the drawings, embodiments of an accessory mount device may form at least a portion of embodiments of a trimmer head for a power tool, such as a trimmer. Accessories for the device may include a cartridge having a length of wire or line, such as trimmer line, wrapped around the spool.

The present disclosure may further be directed to a power tool including a trimmer head, such as including embodiments of the housing described herein. The power tool may include a power source, such as a battery, an electrical outlet, or liquid and/or gaseous fuel.

Embodiments of the power tool may include a handle disposed along a connecting member, a housing, or another portion of the power tool. The handle can allow the operator to support the weight of the power tool during operation. A grip can be disposed along the connecting member to permit a second point of contact for the operator. The grip can include, for example, a portion of the connecting member including a user interface. The user interface can include a trigger that allows the operator to selectively control the power tool, such as to provide or increase output voltage such as described herein. The user interface can further include other controls which permit the operator to effect change to the power tool. For instance, by way of non-limiting example, the user interface may include any one or more of a cruise control feature allowing the operator to maintain the operating speed of the trimmer head, a turbo which allows the power tool to reach full operational speed, a power switch having at least ON and OFF functionality, a safety, or any other desirable user controls. The user interface can include a trimmer line advance interface configured to selectively feed trimmer line from the cartridge when actuated.

Embodiments of the method provided herein may include steps, functions, or operations such as depicted and described herein in regard to the device. Some embodiments of the method may include methods for operating a trimmer tool to selectively egress wire or line from a trimmer head. Methods may include methods for operating a spool to selectively egress wire or line from an accessory mount device. It should be appreciated that embodiments of the device and method provided herein may be applied generally to wire or line feed spool devices positioned within rotatable structures.

Figure 2:
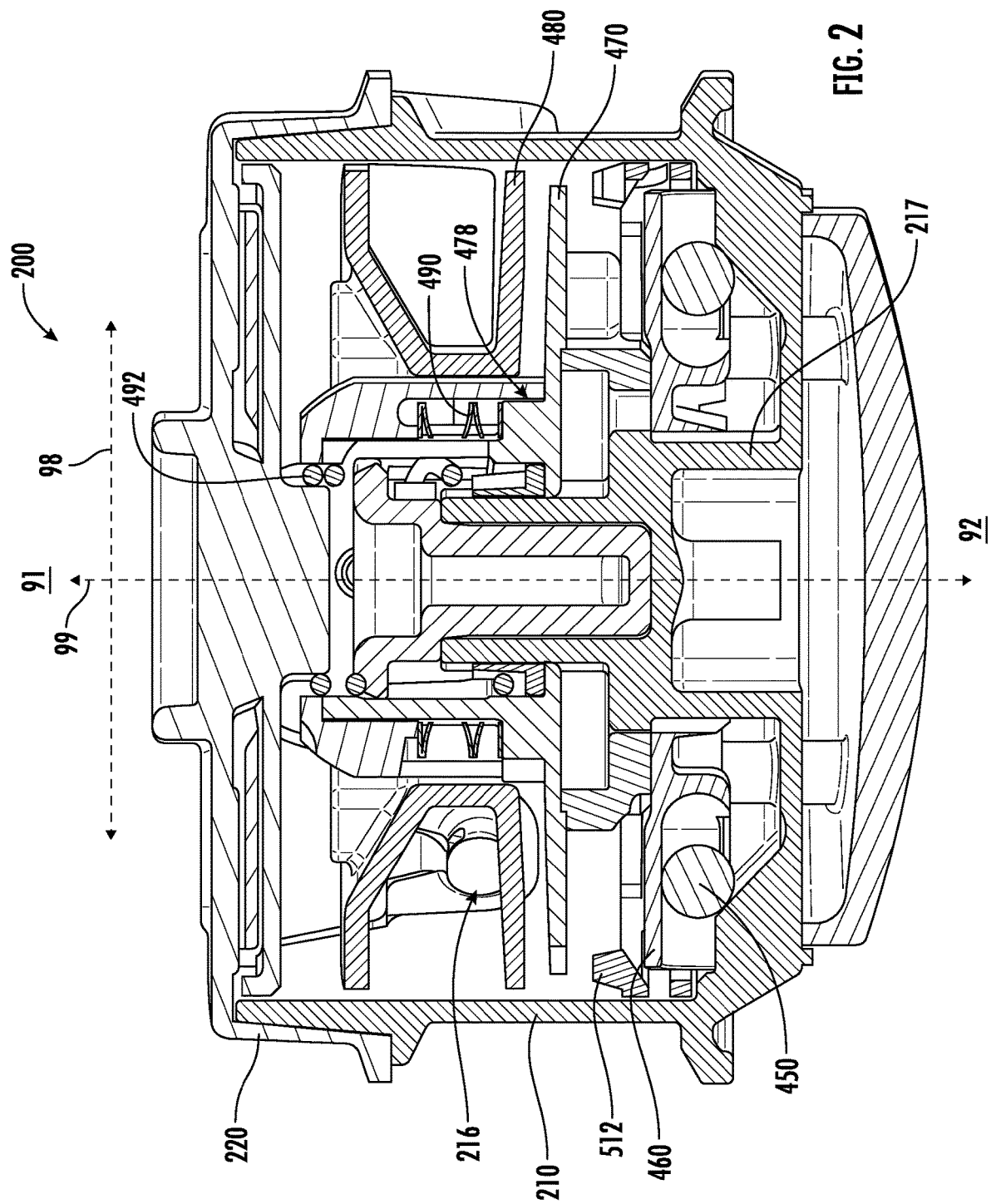
FIG. 2 provides a cross section view of an embodiment of an accessory device for a power tool in accordance with aspects of the present disclosure.

FIG. 1 provides a perspective view of an exemplary device 200 in accordance with aspects of the present disclosure. FIG. 2 provides a cross-sectional side view of an embodiment of the device in accordance with aspects of the present disclosure. A reference first axis 99 extends substantially as a centerline through the device 200. A reference first direction extends co-directional to the first axis 99. A reference second direction 98 extends radially from the first axis 99. A reference first end 91 and a reference second end 92 are separated along the first axis 99. The first end 91 may define an upper end and the second end 92 may define a lower end. However, it should be appreciated that the first end and the second end may define laterally spaced ends, transversely spaced ends, longitudinally spaced ends, or other appropriate coordinate system.

A cartridge 480 may form a trimmer line spool configured to retain and release a length of wire or line. In some embodiments, the line may be 0.080 inch trimmer line. However, it should be appreciated that other diameters of line may be utilized, such as 0.065 inch trimmer line. The device 200 may form an opening 216 through which line may feed from the cartridge 480 through an opening 216, such as for cutting or trimming during operation of a power tool such as described herein. For instance, the opening 216 may be formed through a housing 210 forming an interior volume at which a feeder assembly is disposed, such as described herein. The device 200 includes a top cover 220 attachable to the housing 210. The housing 210 and top cover 220 are connectable together to form the interior volume into which the feeder assembly is positioned.

The lifter plate assembly may include a first plate 460 at which a lifter mechanism configured as a ball or cylindrical bearing 450 pushes to displace the first plate 460. The bearing 450 is positioned to move along a ramped surface 212. In various embodiments, the ramped surface 212 may be formed at the housing 210, such as at an interior surface within the housing 210. However, it should be appreciated that the ramped surface 212 may be positioned at another component positioned within the housing 210.

Figure 3:
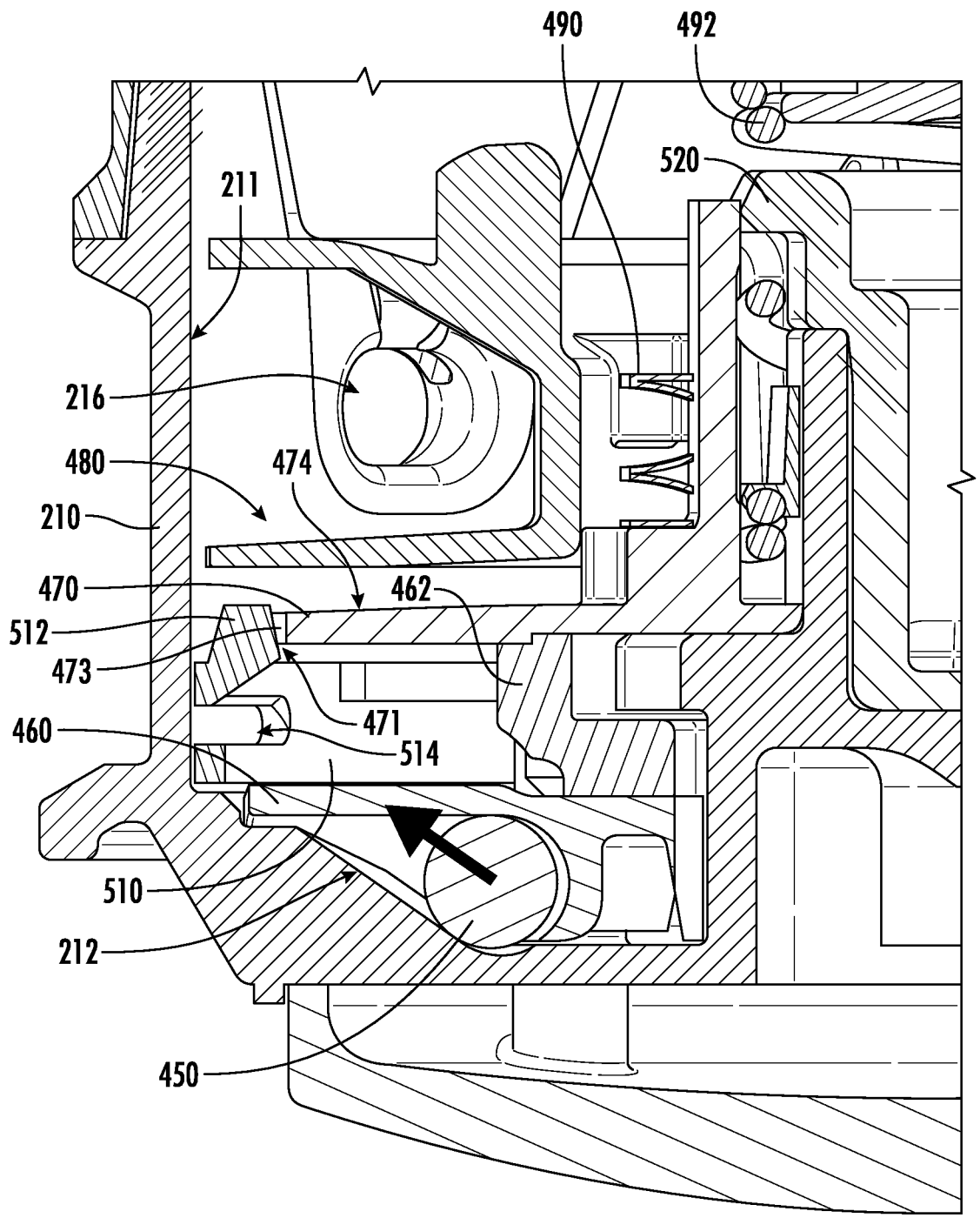
FIG. 3 provides a detailed cross section view of an embodiment of an accessory device in a lowered position in accordance with aspects of the present disclosure.
Figure 4:
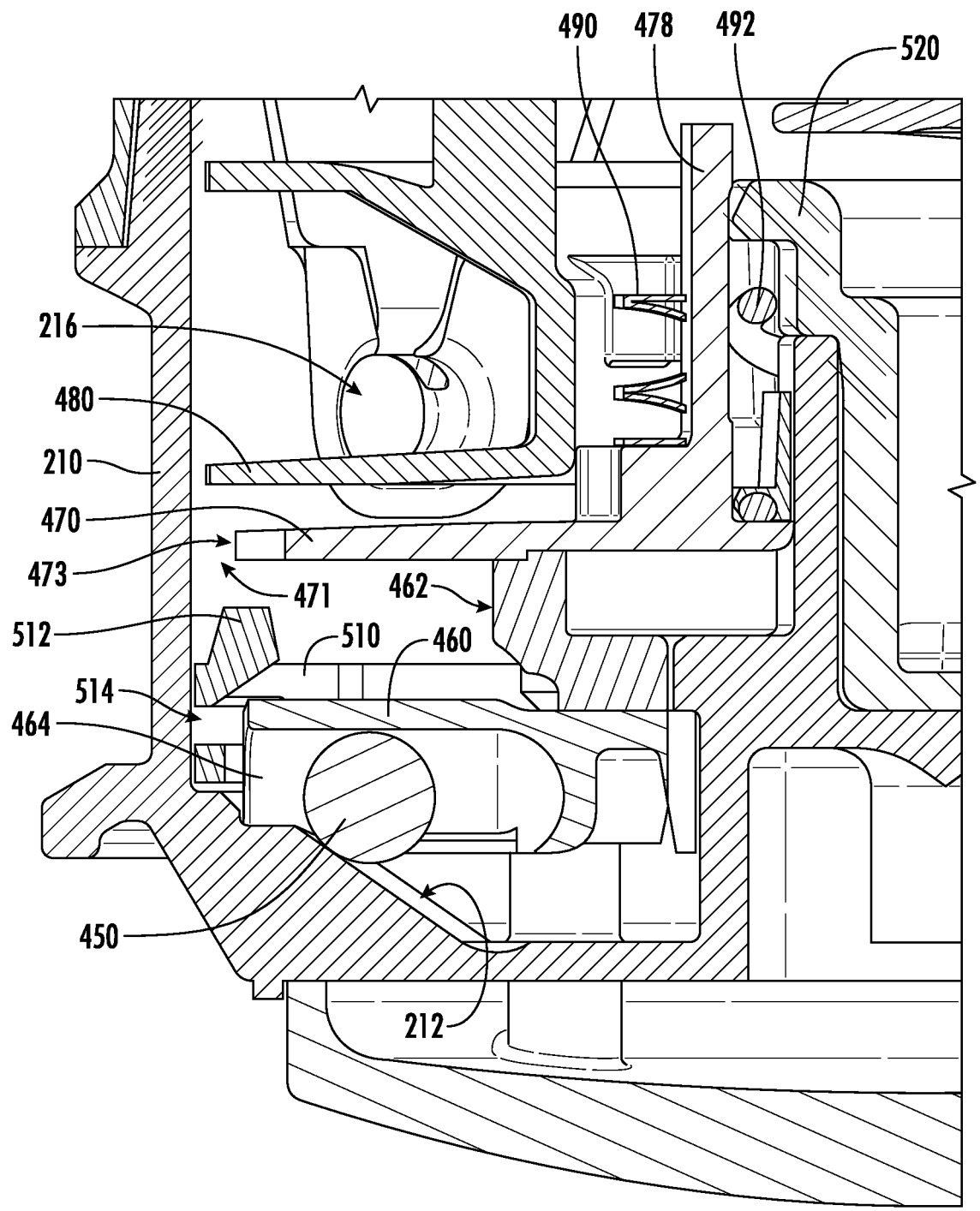
FIG. 4 provides a detailed cross section view of an embodiment of an accessory device in a raised position in accordance with aspects of the present disclosure.
Figure 5:
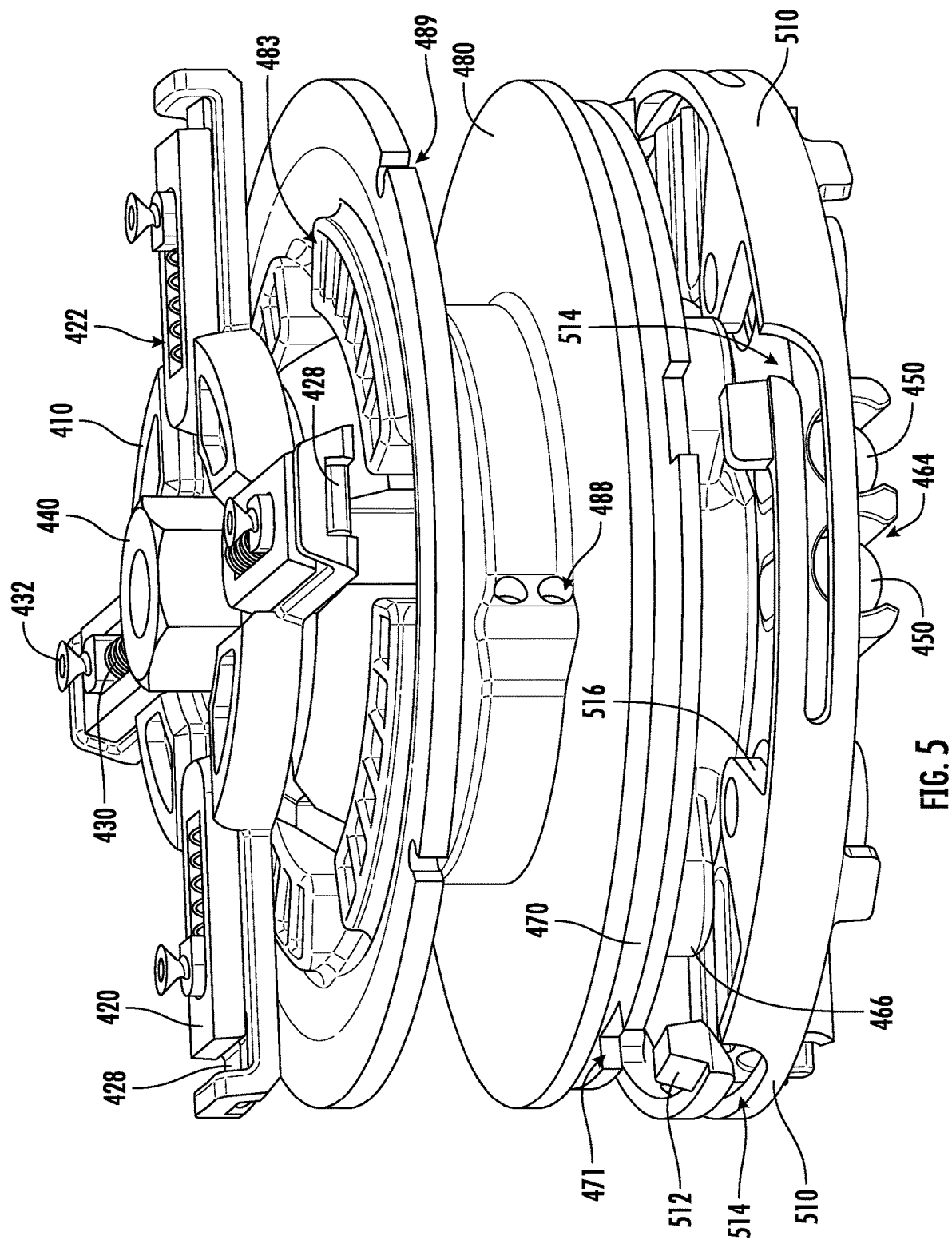
FIG. 5 provides a perspective view of an embodiment of an accessory device, with a housing omitted for clarity, in accordance with aspects of the present disclosure.
Figure 6:
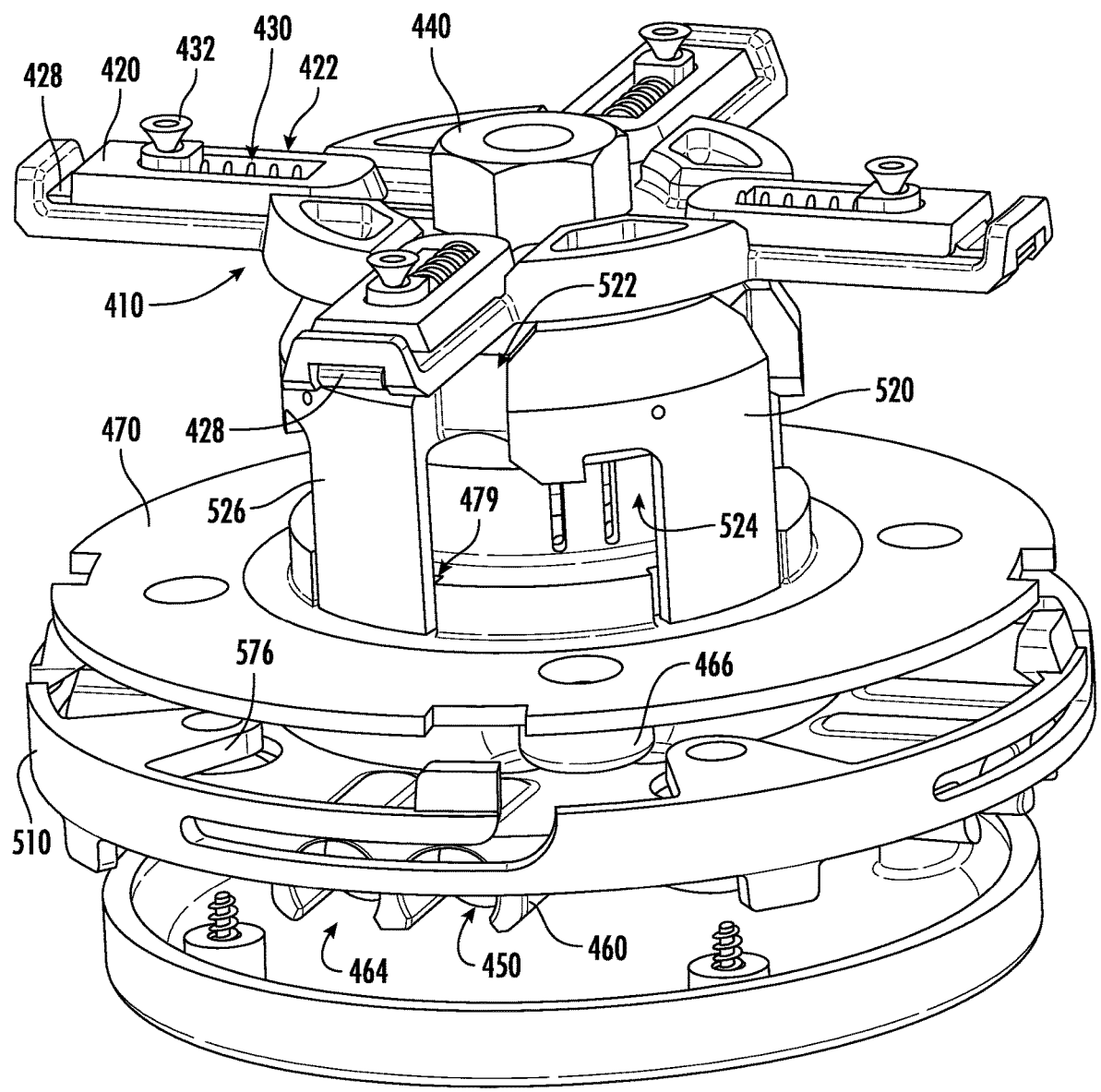
FIG. 6 provides a perspective view of an embodiment of an accessory device, with a housing and spool omitted for clarity, in accordance with aspects of the present disclosure.
Figure 7:
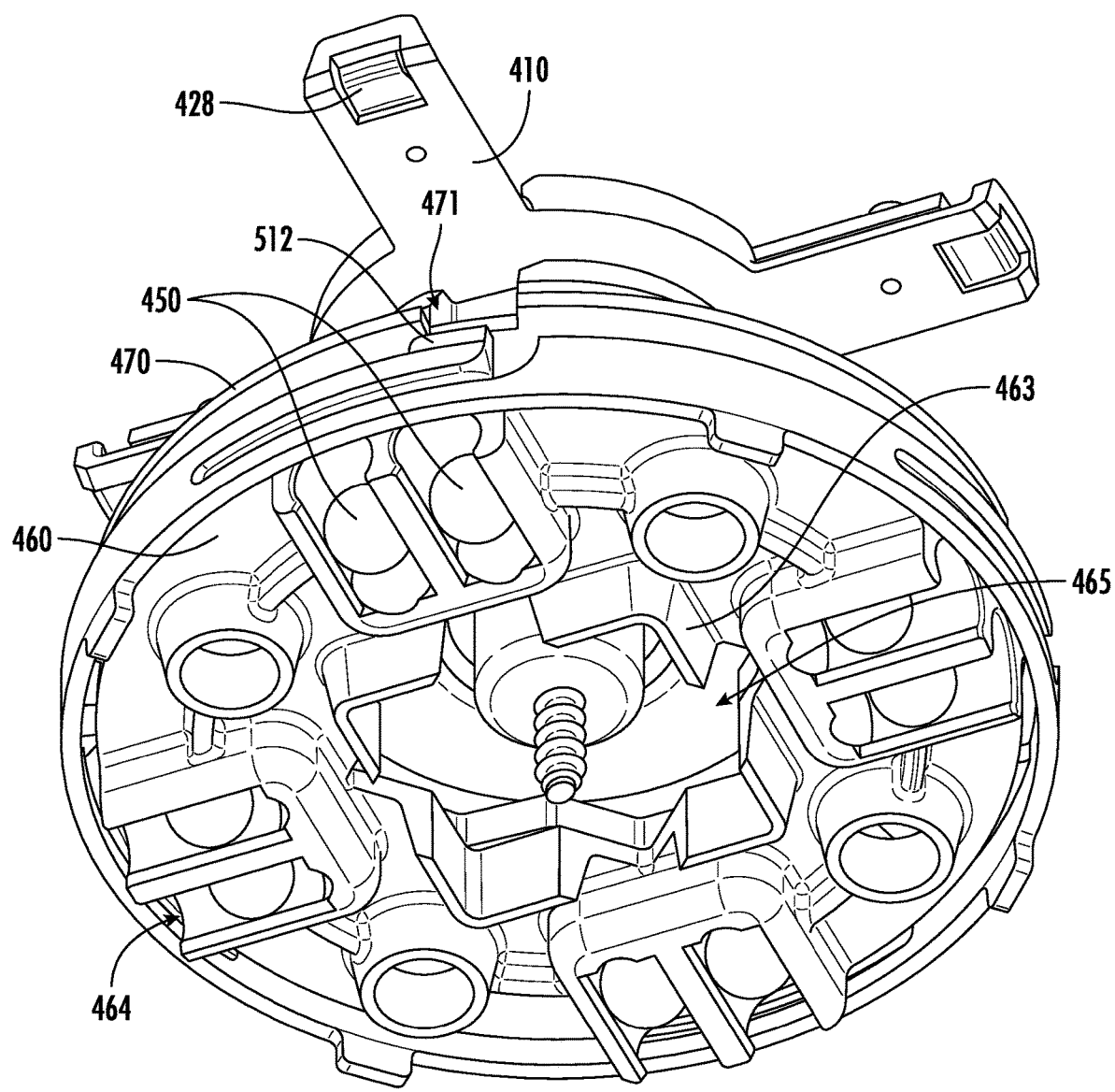
FIG. 7 provides a perspective view of a portion of an embodiment of an accessory device in accordance with aspects of the present disclosure.

The bearing 450 is positioned to push the first plate 460 upward (e.g., toward the first end 91). In an exemplary method for operation, the user adjusts, e.g., increases, rotational speed of the device 200 about axis 99. At or above a threshold rotational speed, centrifugal force moves the bearing 450 along the ramped surface 212 to push the first plate 460 upward, such as depicted in FIG. 3 and FIG. 4. The first plate 460 lifts a carrier 300 (e.g., a spool) at which trimmer line is wrapped.

In various embodiments, the first plate 460 contacts a second plate 470 to push the cartridge 480 along the first axis 99. The second lifter 470 may be biased downward (e.g., toward the second end 92) by a spring 492. The second plate 470 includes an opening 471 formed between an outer perimeter 473 of a circumferentially extending platform 474 of the second lifter 470 and an inner cylindrical wall 211 of the housing 210.

A ring 510 circumferentially surrounds the second lifter 470 and includes a tab 512 extending into the opening 471 between the housing 210 and the second lifter 470. In various embodiments, the lifter plates 460, 470 form disks. In a first position, such as depicted in FIG. 3, the tab 512 is positioned in opening 471, such as to disable rotation of the second plate 470. In the first position, the bearing 450 is positioned in a radially inward position, such as at a lower end of the ramped surface 212. At or above a threshold speed, centrifugal force moves the bearing 450 along the ramped surface 212 to a radially outward position, such as at an upper end of the ramped surface 212. The bearing 450 pushes the first plate 460 upward, such as depicted in FIG. 4.

Figure 8A:
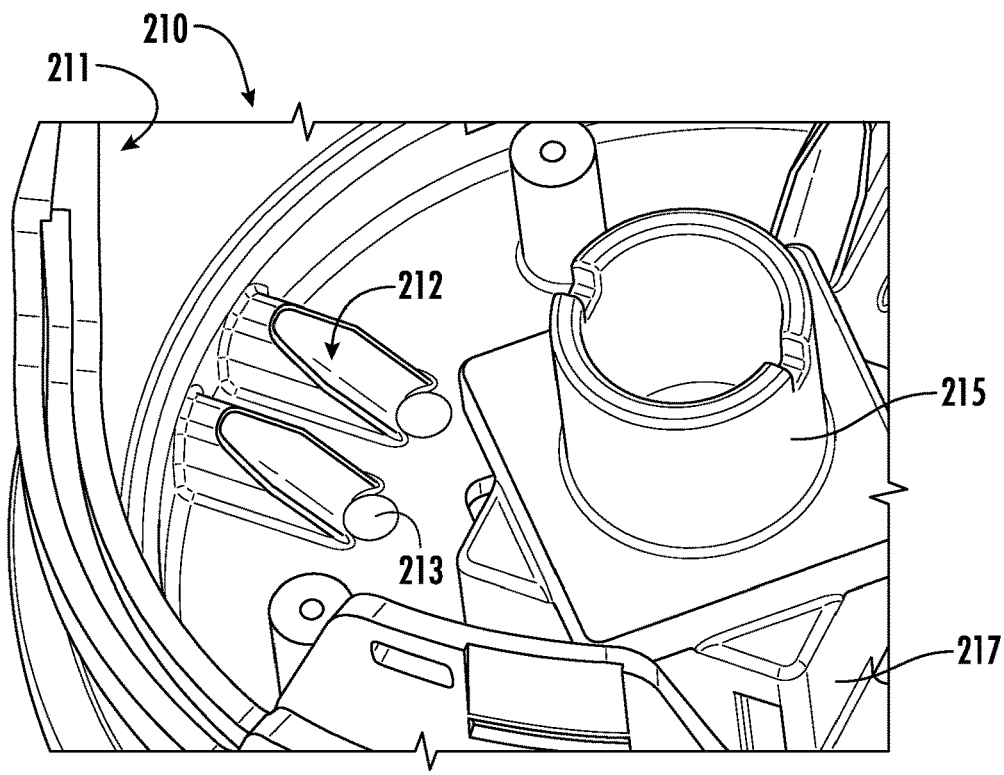
FIG. 8A provides a perspective view of a portion of an embodiment of an accessory device in accordance with aspects of the present disclosure.

Referring briefly to FIG. 8A, the device 200 includes the ramped surface 212. The ramped surface 212 may be formed at the housing 210 and configured to slope upward and downward along the first axis 99. In FIG. 8A, a double ramp configuration is provided. In some embodiments, the housing 210 may form a ball carrier 213 at which the bearing 450 is allowed to rest at an end of the ramped surface 212. The ball carrier 213 may form a detent. In various embodiments, the ball carrier 213 forms an edge over which the bearing 450 rides over to go up the ramped surface 212. The ball carrier 213 may form a feature forming a limit beyond which the bearing 450 may move up the ramped surface 212. For instance, below a threshold speed or centrifugal force the bearing 450 stays seated at the ball carrier 213. At or above the threshold speed or centrifugal force, the bearing 450 overcomes an edge of the ball carrier 213 and is allowed to move up the ramped surface 212 and push the first plate 460 up along the first axis 99.

In various embodiments, the housing 210 forms one or more pair of ramped surfaces 212. For instance, the pair of ramped surfaces 212 may be positioned adjacent to one another and extending co-directional to one another. The device 200 may include pairs of ramped surfaces 212 distributed equally from one another (e.g., two pair of ramped surfaces 212, or three pair of ramped surfaces 212, or four ramped surfaces 212, etc.). The pair of ramped surfaces 212 may allow for a desirably small diameter of bearing 450 while providing desired response to centrifugal loading to operate at appropriate ranges of rotational speed to feed the trimmer line.

Figure 8B:
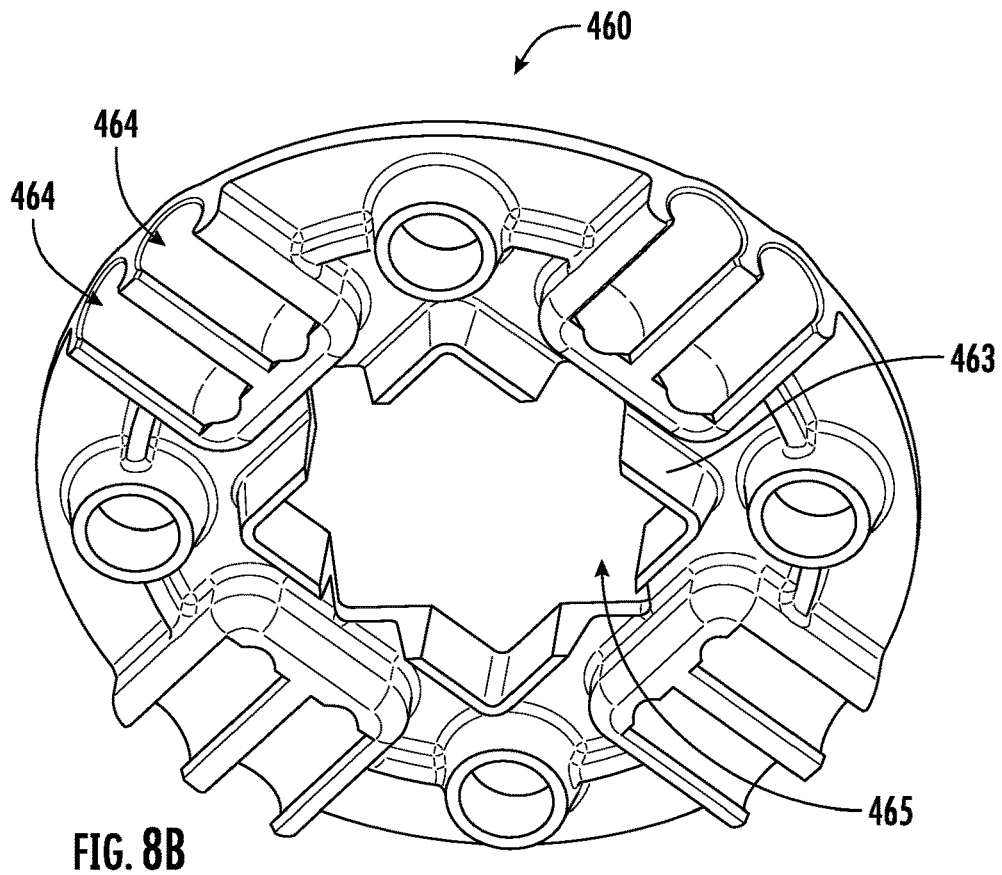
FIG. 8B provides a perspective view of a portion of an embodiment of an accessory device in accordance with aspects of the present disclosure.
Figure 9:
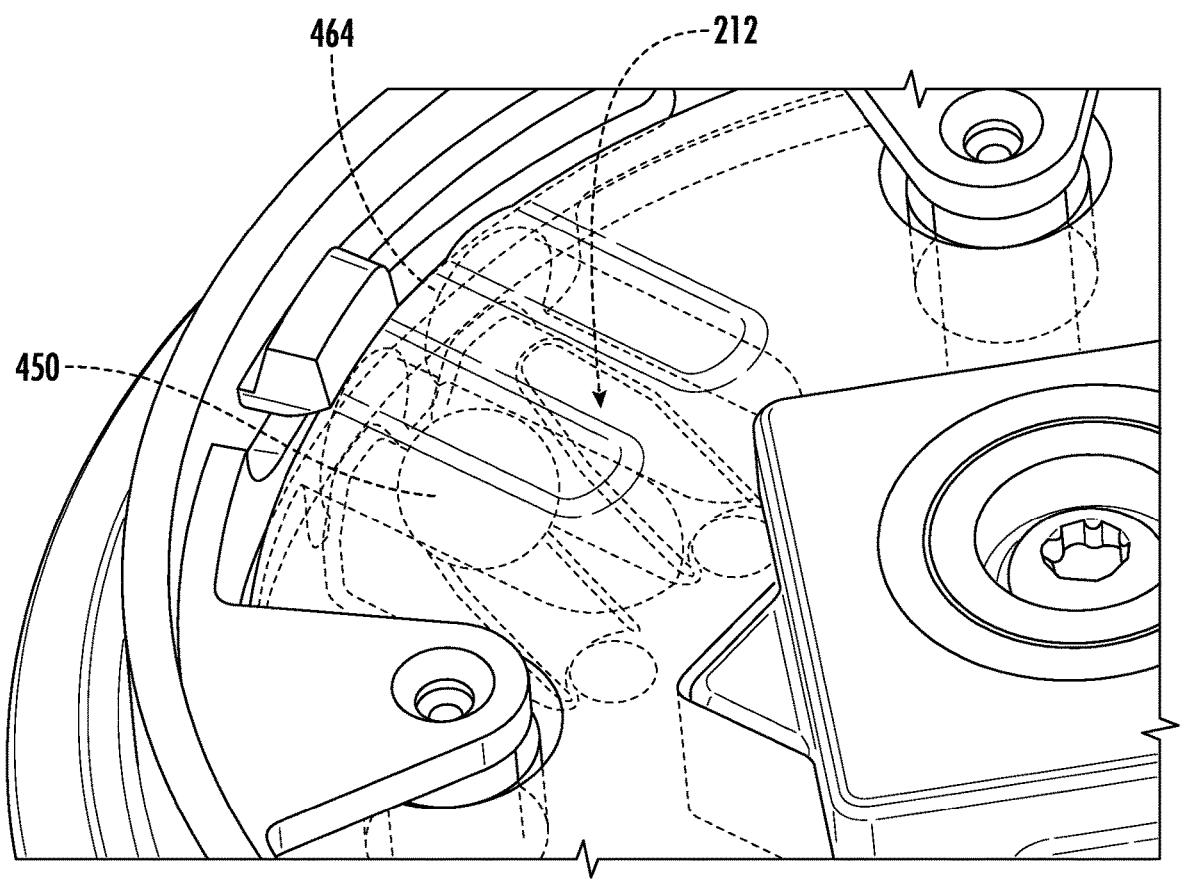
FIG. 9 provides a perspective view of a portion of an embodiment of an accessory device in accordance with aspects of the present disclosure.

Referring briefly to FIG. 8B and FIG. 9, the first plate 460 includes a channel 464 corresponding to the ramped surface 212. The bearing 450 is positioned at the channel 464, such as to provide a pathway along which bearing 450 moves along the ramped surface 212. The channel 464, the ramped surface 212, or both, may form a groove having a diameter corresponding to the bearing 450. The channel 464, ramped surface 212, or both, may furthermore capture or retain the bearing 450 at the ramped surface 212. The channel 464 may provide a terminal end at which the bearing 450 may rest at the lower end of the ramped surface 212. In various embodiments, the channel 464 corresponds to the ramped surface 212, such as to provide double channel or double barrel configurations, such as described above.

Movement of the first plate 460 upward toward the first end 91 pushes the second plate 470 upward along the first axis 99 to displace the platform 474 above the tab 512 to allow for rotation of the second plate 470. Bearings 450 may allow for substantially even distribution of loads to the first lifter 460. The bearing 450 may promote lifter assembly tuning, such as to promote action or articulation at or above particular threshold speeds or centrifugal forces. For instance, diameter, weight, density, surface finish, quantity, material, or other physical property of bearing 450 may be more easily adjusted to move along the ramped surface 212 at a desired rotational speed or centrifugal force.

In a non-limiting exemplary embodiment, the device 200 may include eight (8) bearings 450 positioned at respective grooves formed by ramped surfaces 212 and channels 464. Grooves may be evenly distributed in circumferential arrangement, or distributed in pairs in circumferential arrangement to promote balance. However, it should be appreciated that other embodiments may include any desired quantity of lifters 450, surfaces 212, and channels 464. For instance, other embodiments may include any desired multiple of two (2) lifters 450, surfaces 212, and channels 464.

A spacer 462 may be positioned between the lifter plates 460, 470 to translate movement of the first plate 460 to movement of the second plate 470. For instance, the spacer 462 extends along the first axis 99 between the lifter plates 460, 470. Spacer 462 may form a circumferentially extending plate including openings 467. Opening 467 may be formed through a post or arm 466 extending radially outward relative to the first axis 99. The second plate 470 may include longitudinally extended members 477 configured to selectively extend into a respective opening 467. Member 477 may extend along the first axis 99 from a lower surface of the platform 474. In various embodiments, the spacer 462 and second plate 470 are fastened together, bonded, or integrally formed together, such that the spacer 462 and second plate 470 move together.

A center post 478 may extend along the first axis 99 from the second plate 470 to the first end 91. For instance, the center post 478 may form a cylindrical or polygonal structure extending from the platform 474 of the second plate 470. The spring 490 may react along the first axis 99 against the second plate 470 to bias the second cartridge 480 upward along the first axis 99 toward the first end 91 after locking into position. In various embodiments, the center post 478 and the platform 474 may form integral components of the second plate 470.

In various embodiments, spring 490 may react against a flange extending from the cartridge 480. The spring 490 may be positioned to mechanically couple the second plate 470 to the cartridge 480. For instance, displacement of the first plate 460 upward, such as described herein, displaces the second plate 470 upward. Spring 490 may transfer movement to the cartridge 480 to lift the cartridge 480 upward, such as depicted in FIG. 3 and FIG. 4. Displacement of the cartridge 480 along the first axis 99 may position trimmer line at the cartridge 480 along the first axis 99 relative to the opening 216 at the housing 210 to allow for a length of line to egress therethrough.

Low speed locks may include simple cantilevered snaps into the top cover 220 and holding the housing in place until approximately a rotational speed threshold (e.g., approximately 700 revolutions per minute (RPM)). At and above the rotational speed threshold hold (e.g., approximately 700 RPM), weighted lugs 420 slide out (e.g., outward along direction 98 from axis 99) and engage geometry protruding from the housing 210 (e.g., end 428 at lug 420 selectively engages opening 218 at housing 210). The lug 420 slides substantially or completely straight out (e.g., along direction 98 from axis 99) due to centrifugal force. For instance, the magnitude of centrifugal force may correspond to the rotational speed threshold. When the trimmer slows down (e.g., down toward the first speed threshold, e.g., toward 700 RPM and below) the lugs 420 retract under spring force (e.g., retract toward axis 99) from spring 430.

In various embodiments, the lugs 420 are any appropriate material configured with mass to compress a spring 430 (e.g., the spring 430 configured as a return spring). The retainer housing 410 holds the lugs 420 and return springs 430 in position. In various embodiments, the lug 420 may include a body forming an opening 422 through which the spring 430 is positioned and compressible. For instance, fastener 432 may extend through the lug 420 and the retainer housing 410 to hold the lugs 420 and return springs 430 in position at the retainer housing 410.

Recesses in the top cover 220 snap the lower housing 210 into place. The retainer housing 410 holds at least a portion of a fastener 440 (e.g., flanged nut, such as an arbor nut, having a left-hand thread or right-hand thread). For instance, the retainer housing 410 may include a fastener opening 412 at which a portion of the fastener 440 is receivable. The top cover 220 is configured to hold another portion of the fastener 440. For instance, the top cover 220 may include a fastener opening 226 at which a portion of the fastener 440 is receivable. In various embodiments, retainer housing 410 is affixed by fastener 440 to hold the weight and retainer 520 in position. In some instances, the top cover 220 is configured to receive and contact an upper portion of the fastener 440 at the fastener opening 226, and the retainer housing 410 is configured to receive and contact a lower portion of the fastener 440 at the fastener opening 412. The top cover 220 and retainer housing 410 each holding a portion of the fastener 440 may allow for reducing a height of the fastener.

The device 200 may include a polygonal interface profile (e.g., a square profile, a star profile, a double-square or multi-point start, a rectangular profile, etc.) at which a plurality of components is attached to one another. For instance, referring to FIG. 8B, the first plate 460 may include a wall 463 at which a polygonal opening 465 is formed along a center portion of the first plate 460. The opening 465 is configured to attach to a corresponding center post 217 (FIG. 8A) at the housing 210.

The second plate 470 may further extend around a center body 215 extending along from the center post 217.

Spring 492 is positioned between a spring and cartridge retainer 520 and an internal bore at center post 478.

Figure 10:
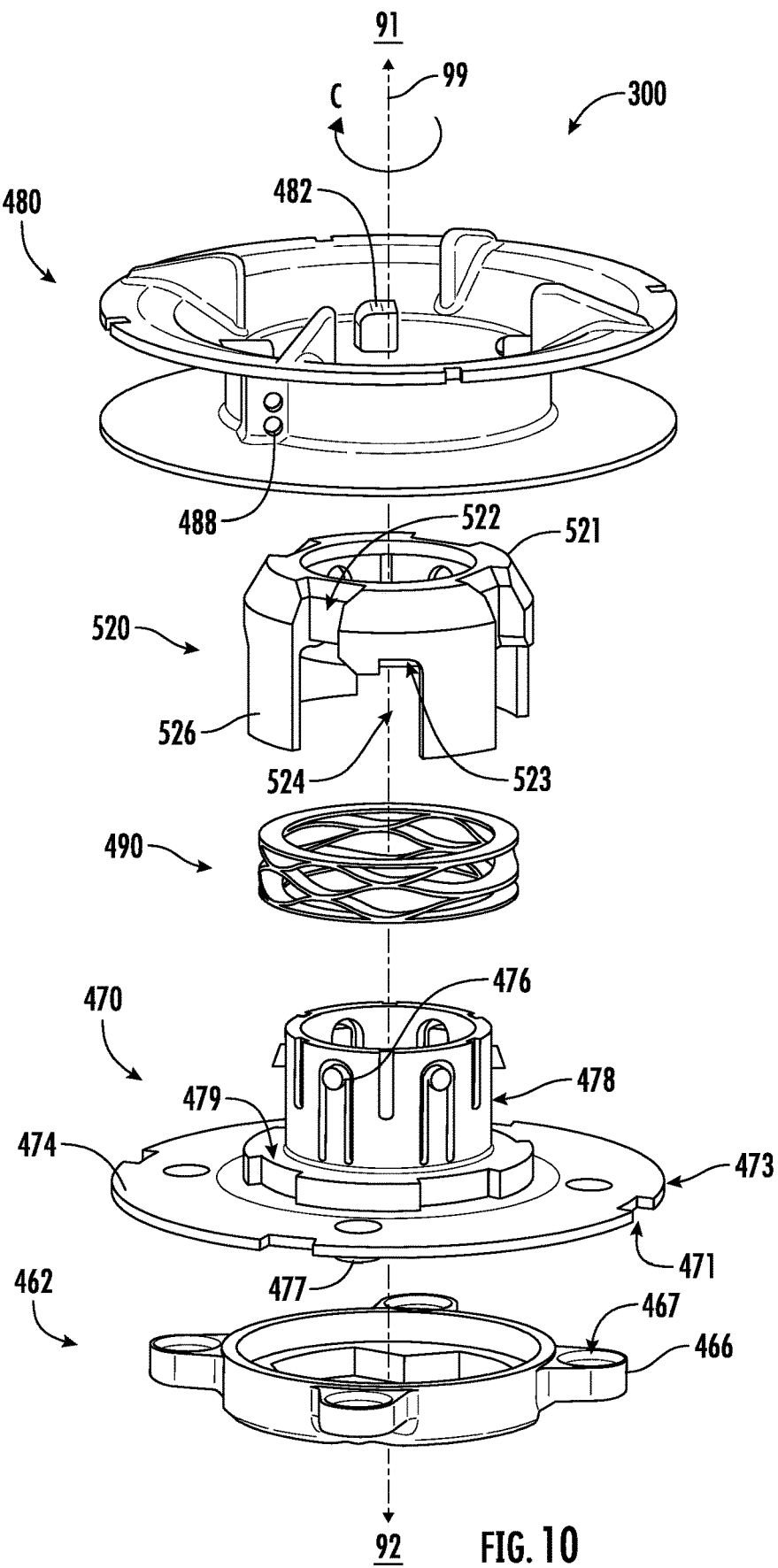
FIG. 10 provides an exploded view of a carrier assembly of an embodiment of an accessory device in accordance with aspects of the present disclosure.
Figure 11:
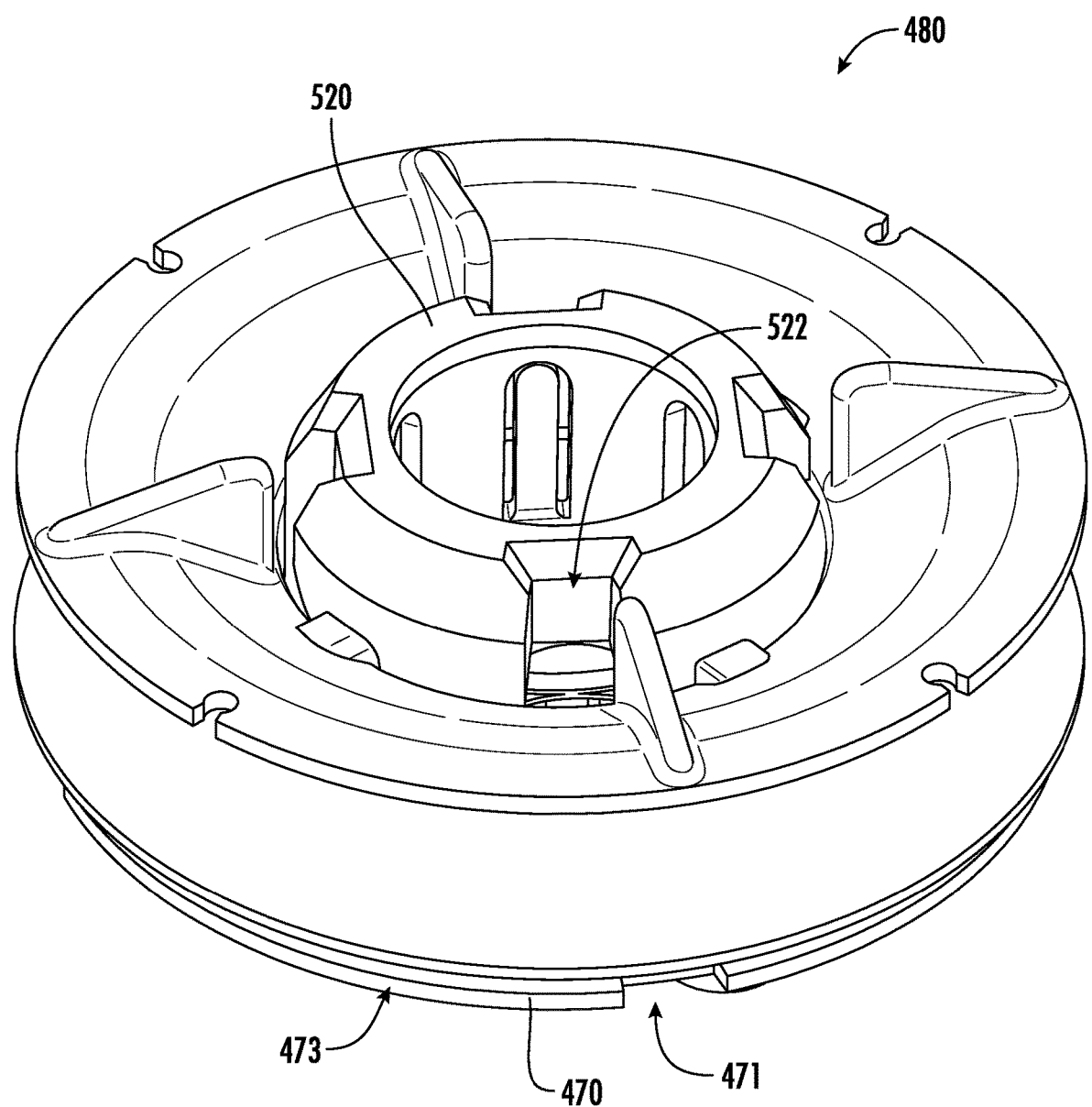
FIG. 11 provides a perspective view of a portion of an embodiment of an accessory device in accordance with aspects of the present disclosure.
Figure 12A:
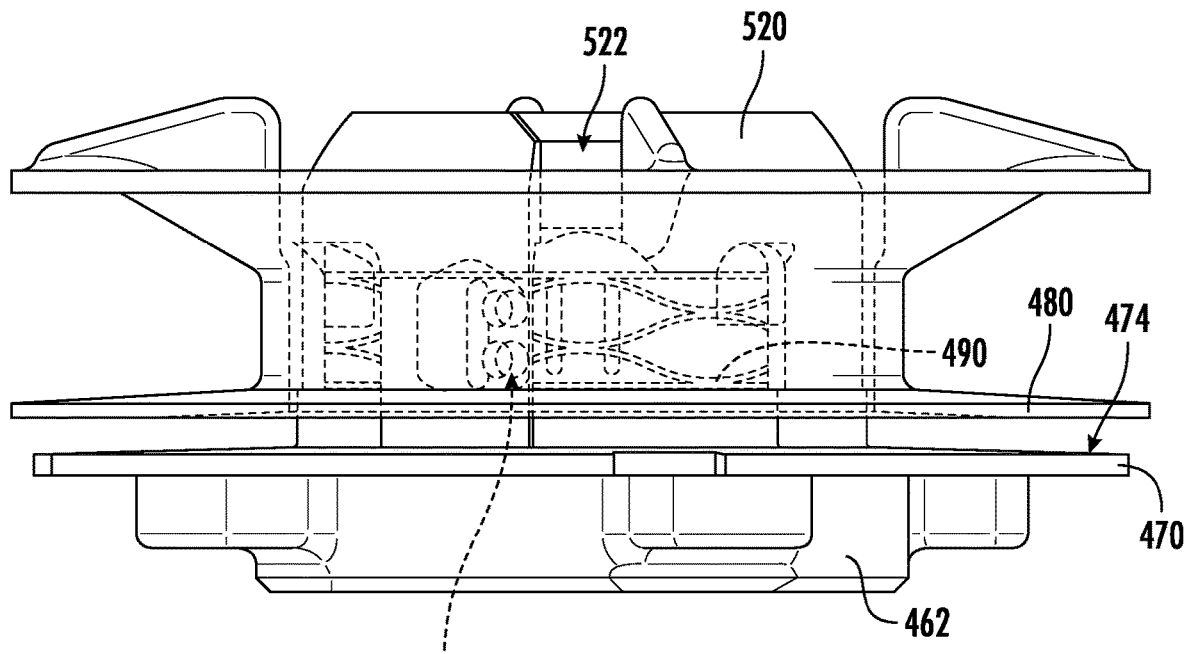
FIG. 12A provides a side view of an embodiment of a portion of an accessory device in accordance with aspects of the present disclosure.
Figure 12B:
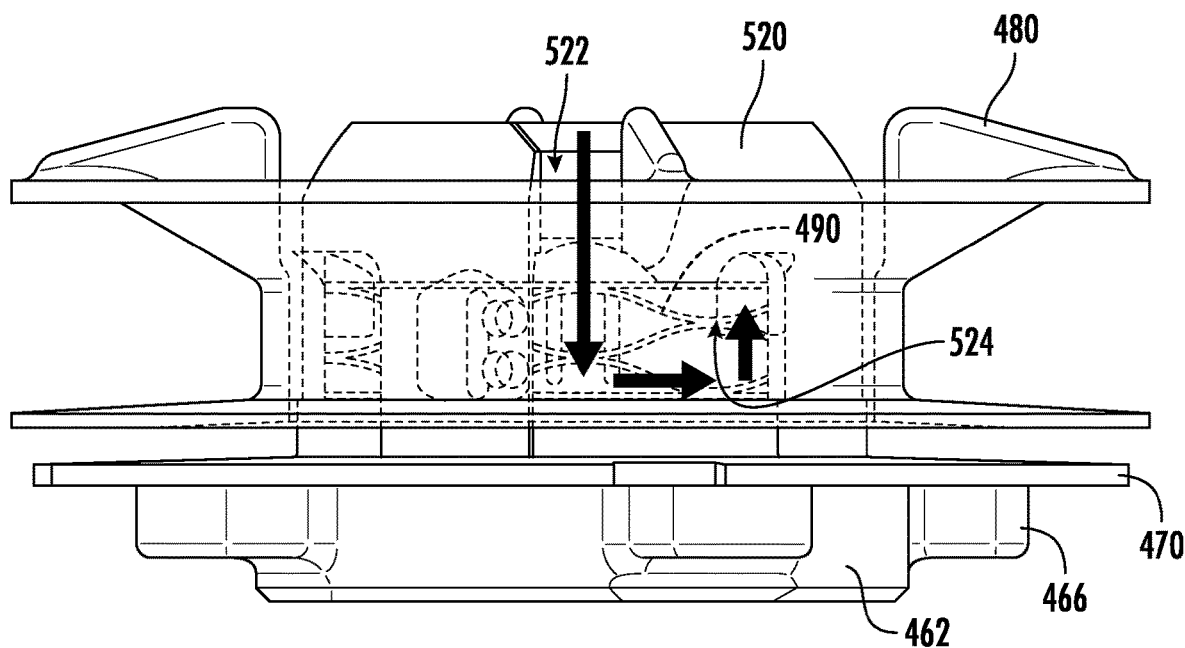
FIG. 12B provides a side view of an embodiment of a portion of an accessory device in accordance with aspects of the present disclosure.
Figure 14:
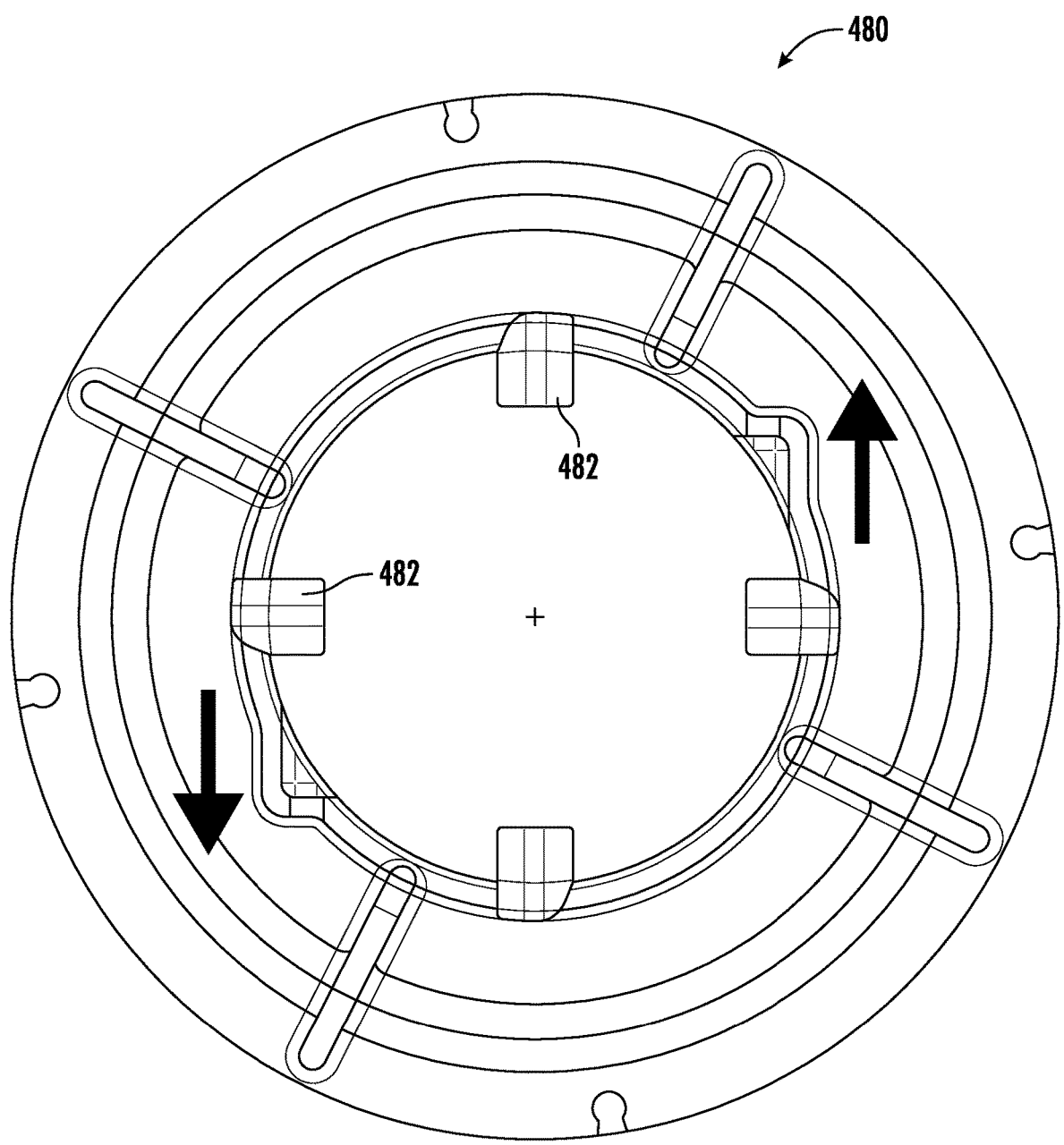
FIG. 14 provides a plan view of an embodiment of a spool of an accessory device in accordance with aspects of the present disclosure.

FIG. 10 provides an exploded view of components of the device 200 forming a carrier assembly 300. The carrier assembly 300 includes a bayonet type locking mechanism configured to align a lug 482 (depicted at the plan view at FIG. 14) at the cartridge 480 with a channel 522 formed at retainer 520. The cartridge 480 is pressed down (e.g., along the first axis 99 toward the second end 92), rotated, and sprung back via spring 490 into a pocket 524 at the retainer 520. The cartridge 480 drives on the lug 482.

The retainer 520 may include a substantially cylindrical centerbody. Posts or tabs 526 extend along the first axis 99 toward the second end 92 from an upper flange 521. The channel 522 extends from the upper flange 521 along the first axis 99 to form an open channel. The channel 522 extends along a circumferential direction C to form the pocket 524. The pocket 524 includes a closed lower flange 523. The lower flange 523 is positioned lower along the first axis 99 than the upper flange 521. The lower flange 523 extends partially along the circumferential direction. Posts or tabs 526 may be separated from one another by the channel 522 and pocket 524 positioned circumferentially therebetween.

Second plate 470 may include recesses 479 separated from one another along the circumferential direction relative to the first axis 99. Recesses 479 are formed to receive a respective post or tab 526 from the retainer 520. For instance, rotation of the second plate 470 such as described herein allows for posts 526 at the retainer 520 to position at various recesses 479 at the second plate 470.

In various embodiments, spring 490 may form a wave spring. The spring 490 is positioned and retained at the locking mechanism to bias the cartridge 480 upward (e.g., along the first axis 99 toward the first end 91). The upward bias forces the lug 482 at the cartridge 480 into the pocket 524 at the retainer 520 or into the open channel 522 based on rotation of the cartridge 480. The lug 482 positioned in pocket 524 prevents vertical or rotational movement of the cartridge 480 relative to the second plate 470 and spacer 462 during trimmer use. Spring 492 biases the second plate 470 and spacer 462 downward along the first axis 99 (e.g., toward second end 92).

The second plate 470 may include the center post 478 forming a retainer configured to hold spring 490. Center post 478 may form a center body extending along the first axis 99 toward the first end 91 from the platform 474. A snap 476 may extend from the center post 478 to attach to the retainer 520. For instance, snap 476 may include a displaceable material, such as a flexible or cantilevered structure allowing the retainer 520 to be engaged to the center post 478.

In an exemplary embodiment of operation of the device 200, to load the line, a single length of line is bent near the middle and anchored through the end of the spool. It is then wrapped around the cartridge 480 over vertical ribs 484 (FIG. 13A and FIG. 13C). For instance, ribs 484 may include partitions configured to form grooves separated from one another along the first axis 99. An angled trajectory of trimmer line, depicted schematically via lines 101, through openings 488 reduces outward spring force of the line, which reduces the drag along an inner face of the cutting head housing 210, such as along inner cylindrical wall 211. Near the end of the line 101, the two leader lengths of line 101 are clipped into a cutout 489 on a top flange 481 and threaded through a hole 483 on the opposite side to keep control of the line when not installed.

FIG. 13B depicts a plan view of a radial pattern of anti-cross wrapping vertical ribs 484 around which the line is wrapped. For instance, the embodiment depicted in FIG. 13B may wrap the line in contrast to contacting the cylindrical wall of the spool all around the circumference. The stiff cutting line 101 is then supported at points (e.g., at ribs 484), resulting in some areas of slack between the line 101 and the cartridge 480 and allowing more movement in the line, such as to prevent binding. The vertical ribs 484 are grooved to keep the first wraps of the line 101 separated from one another, such as to prevent binding. The leaders of the cutting line 101 pass through a clip or cutout 489 to prevent unraveling of the line. Loose ends may be secured through hole 483.

After installing the cartridge 480, the user will pull the leader line 101 to remove the end from the holes 483 and unsnap the line 101 from the clip 489. The clip 489 features are aligned with the openings at the top of the eyelets such that the line feeds into the working position.

In various embodiments, the openings 488 are formed to extend the trimmer line 101 tangent through the cartridge 480. Tangent winding of the trimmer line may generate less outward spring force when wound in contrast to perpendicular winding of trimmer line passing through an axis of rotation.

Figure 15:
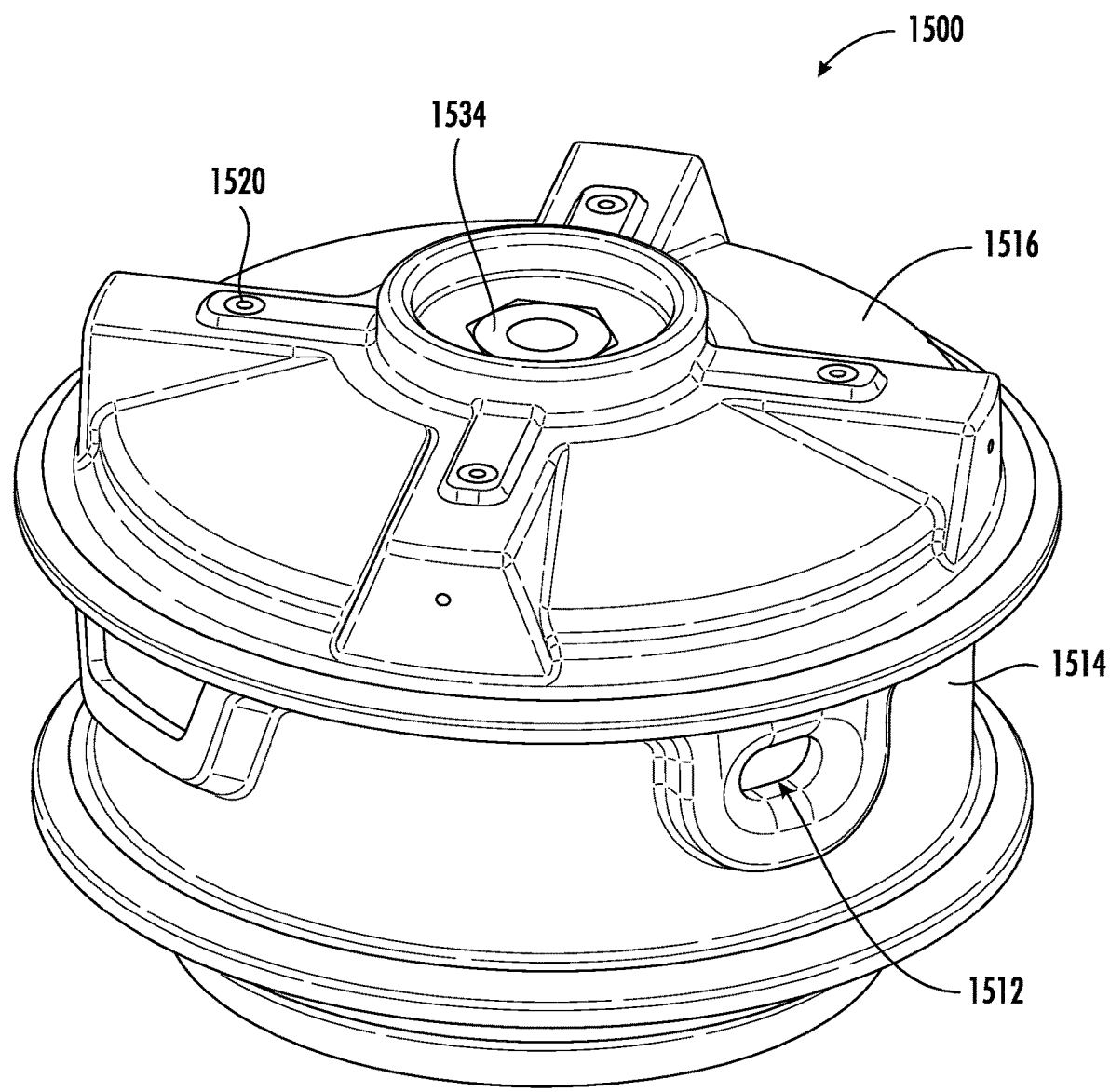
FIG. 15 provides a perspective view of another embodiment of an accessory for a power tool in accordance with aspects of the present disclosure.
Figure 16:
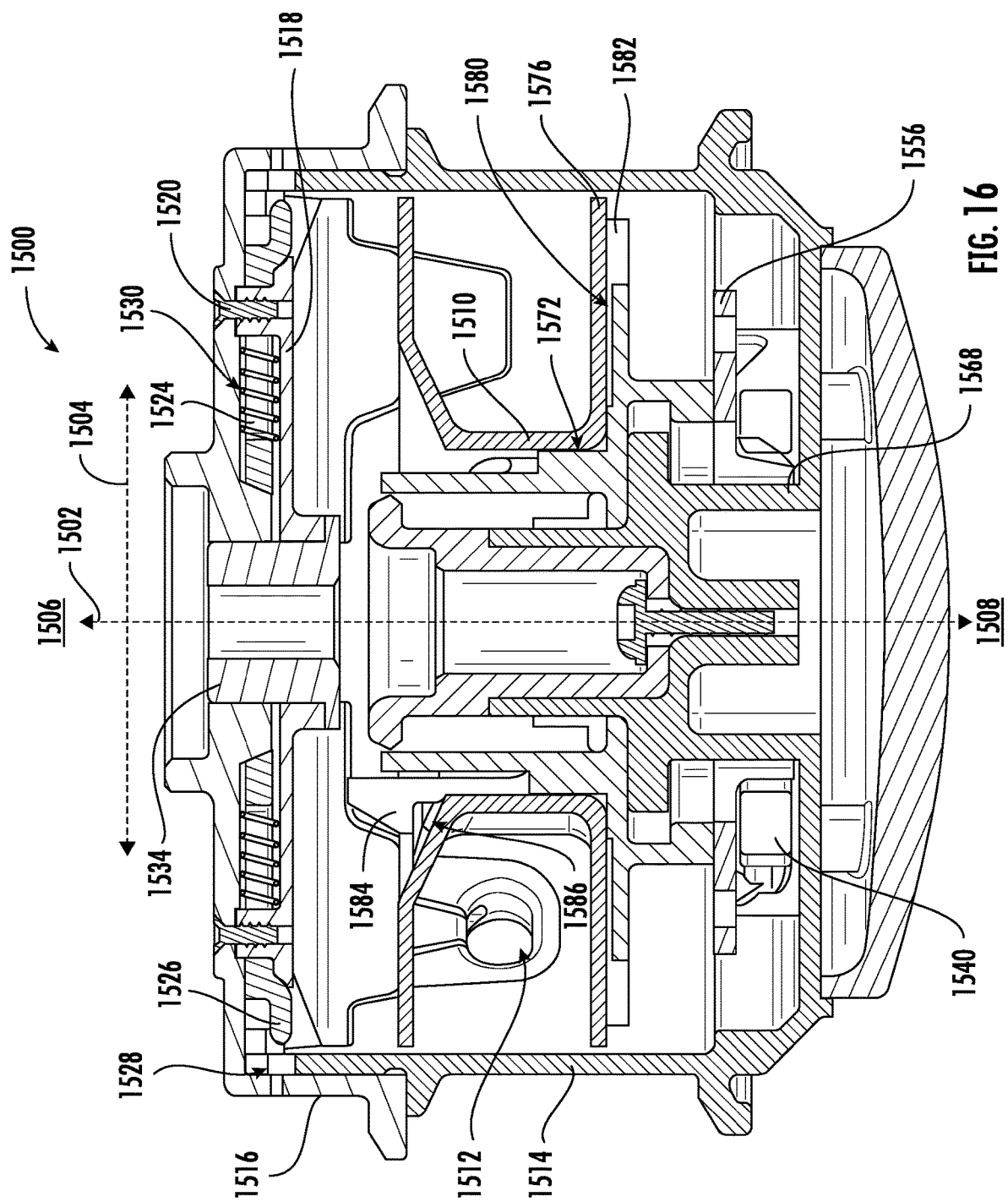
FIG. 16 provides a cross section view of the embodiment of the accessory device of FIG. 15 in accordance with aspects of the present disclosure.

FIG. 15 provides a perspective view of an exemplary device 1500 in accordance with another embodiment of the present disclosure. The device 1500 can share any one or more common features, characteristics, or attributes as compared to the device 200. FIG. 16 provides a cross-sectional side view of an embodiment of the device 1500 in accordance with aspects of the present disclosure. A reference first axis 1502 extends substantially as a centerline through the device 1500. A reference first direction extends co-directional to the first axis 1502. A reference second direction 1504 extends radially from the first axis 1502. A reference first end 1506 and a reference second end 1508 are separated along the first axis 1502. The first end 1506 may define an upper end and the second end 1508 may define a lower end. However, it should be appreciated that the first end and the second end may define laterally spaced ends, transversely spaced end, longitudinally spaced ends, or other appropriate coordinate system.

A spool 1510 may form a trimmer line spool configured to retain and release a length of wire or line. In some embodiments, the line may be 0.080 inch trimmer line. However, it should be appreciated that other diameters of line may be utilized. The device 1500 may form an opening 1512 through which line may feed from the spool 1510 through the opening 1512, such as for cutting or trimming during operation of a power tool such as described herein.

The device 1500 includes a housing 1514 and a top cover 1516. The housing 1514 and top cover 1516 are connectable together to form a volume into which a feeder assembly is positioned.

Figure 17:
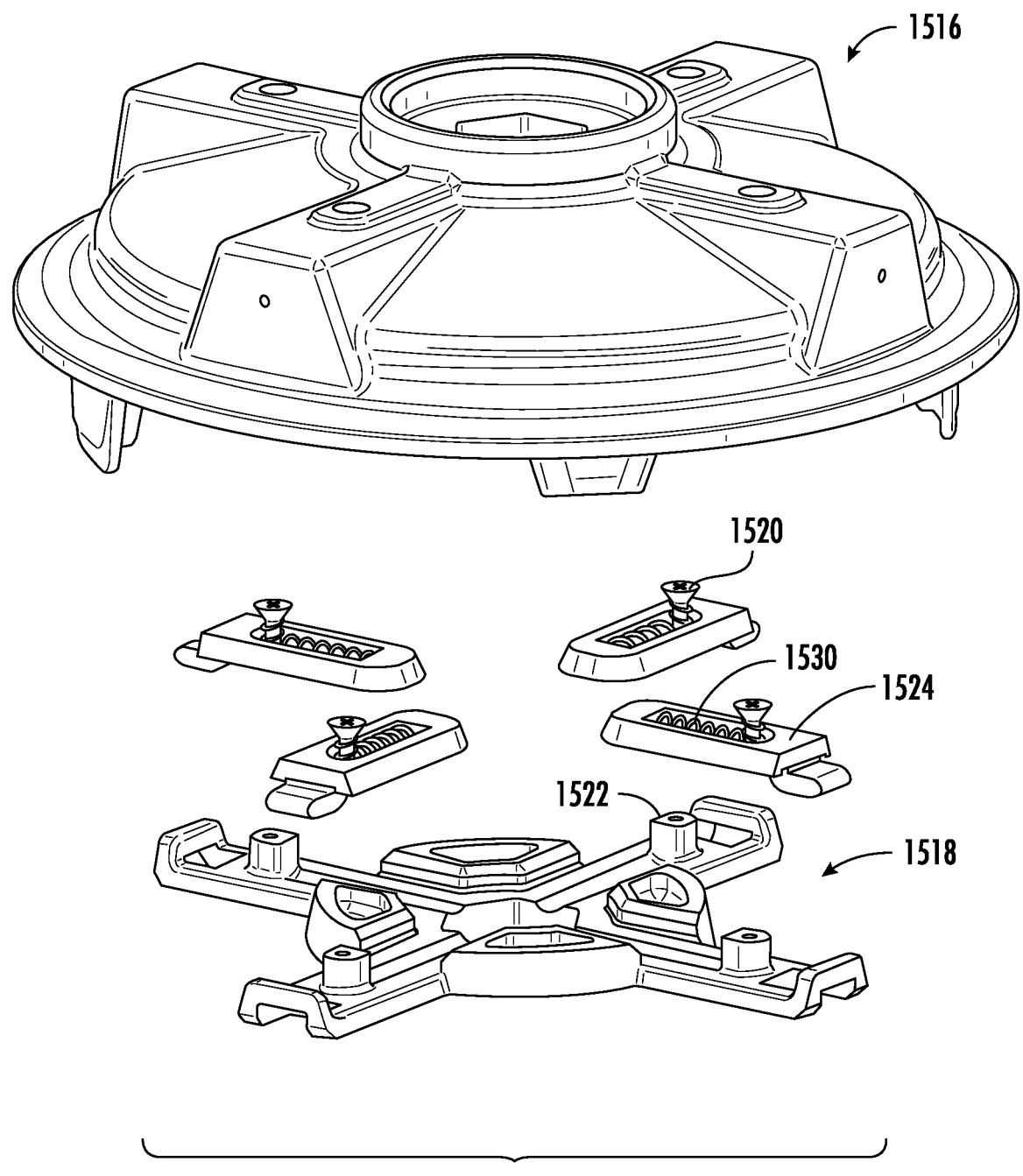
FIG. 17 provides a top exploded view of components of the accessory device of FIG. 15 in accordance with aspects of the present disclosure.
Figure 18:
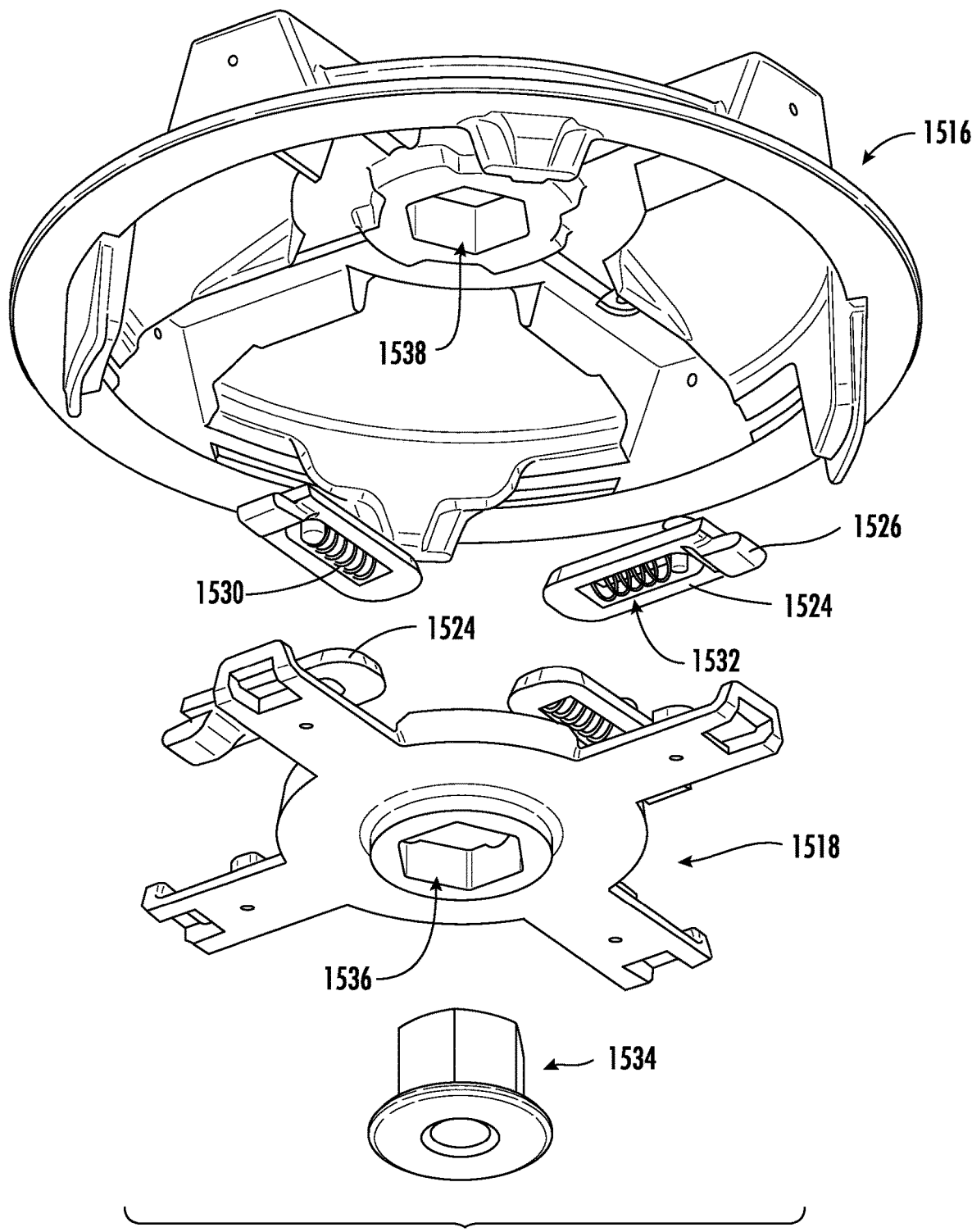
FIG. 18 provides a bottom exploded view of components of the accessory device of FIG. 15 in accordance with aspects of the present disclosure.
Figure 19:
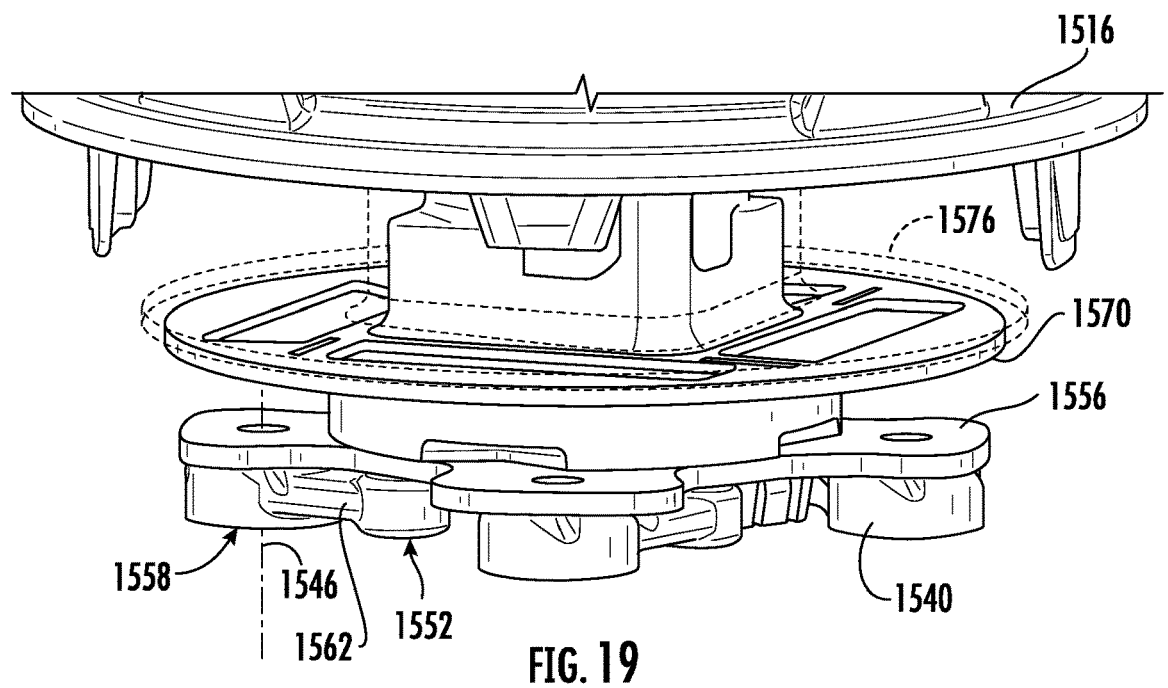
FIG. 19 provides a perspective view of a portion of the accessory device of FIG. 15 in accordance with aspects of the present disclosure.
Figure 20:
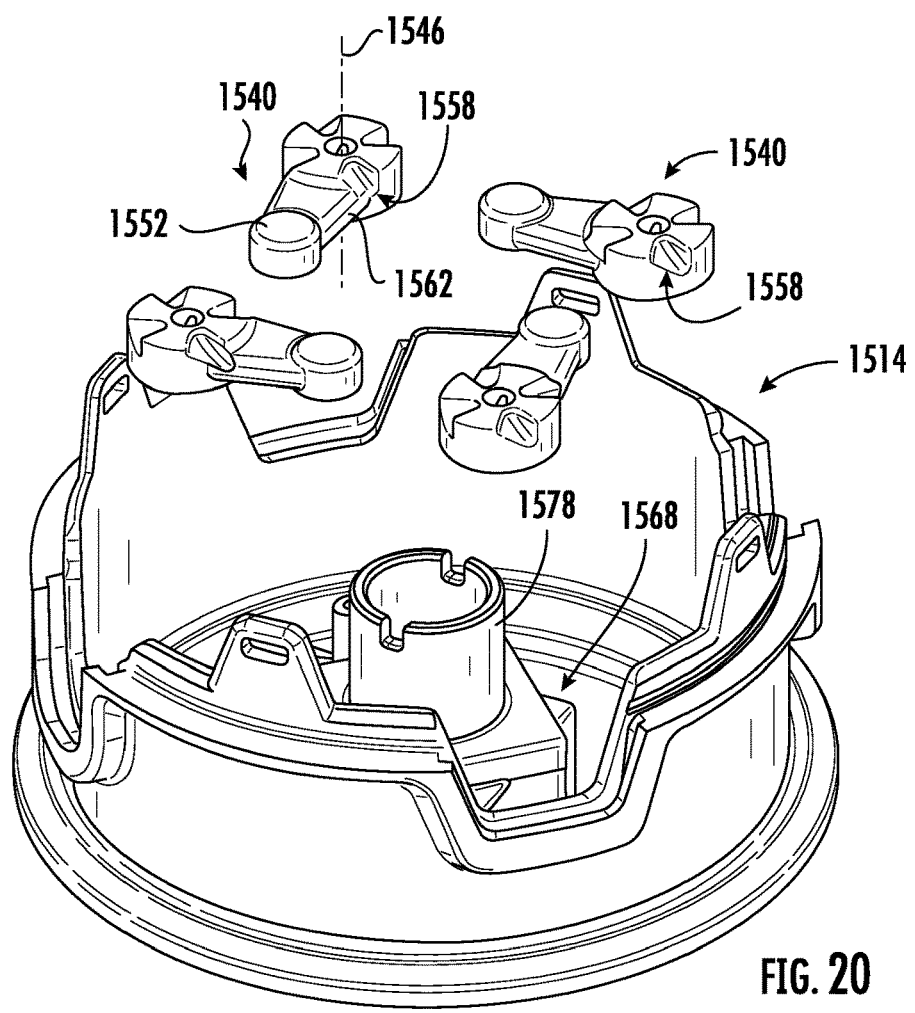
FIG. 20 provides an exploded top perspective view of a portion of the accessory device of FIG. 15 in accordance with aspects of the present disclosure.
Figure 21:
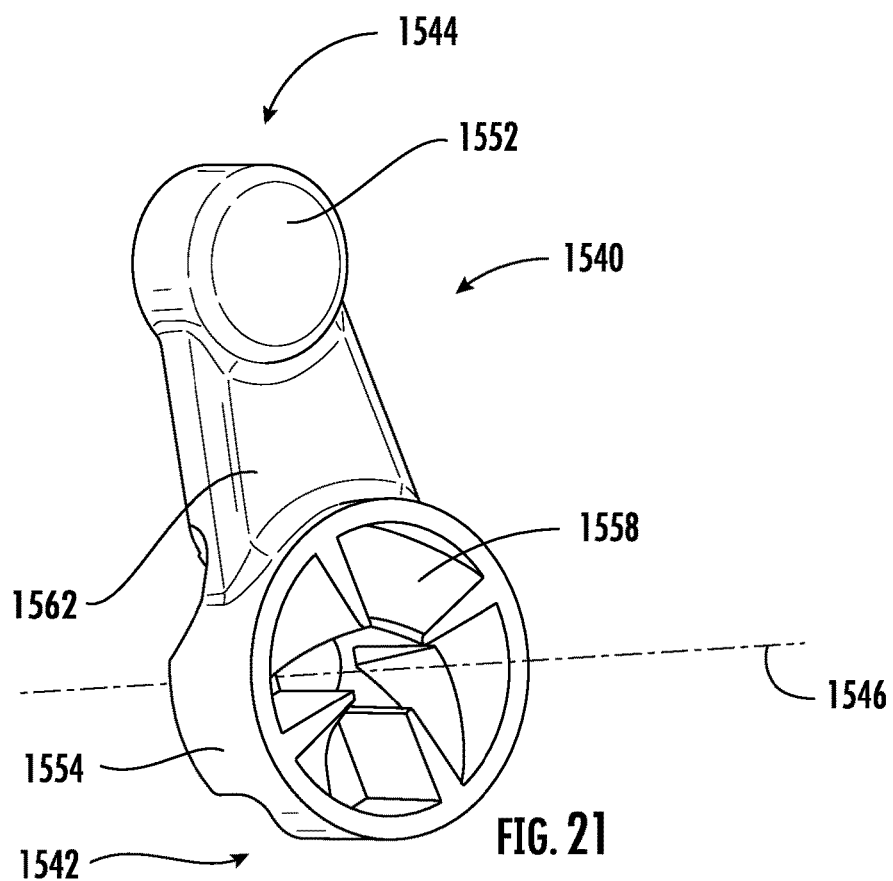
FIG. 21 provides a perspective view of a rotating lifter for the accessory device of FIG. 15 in accordance with aspects of the present disclosure.
Figure 22:
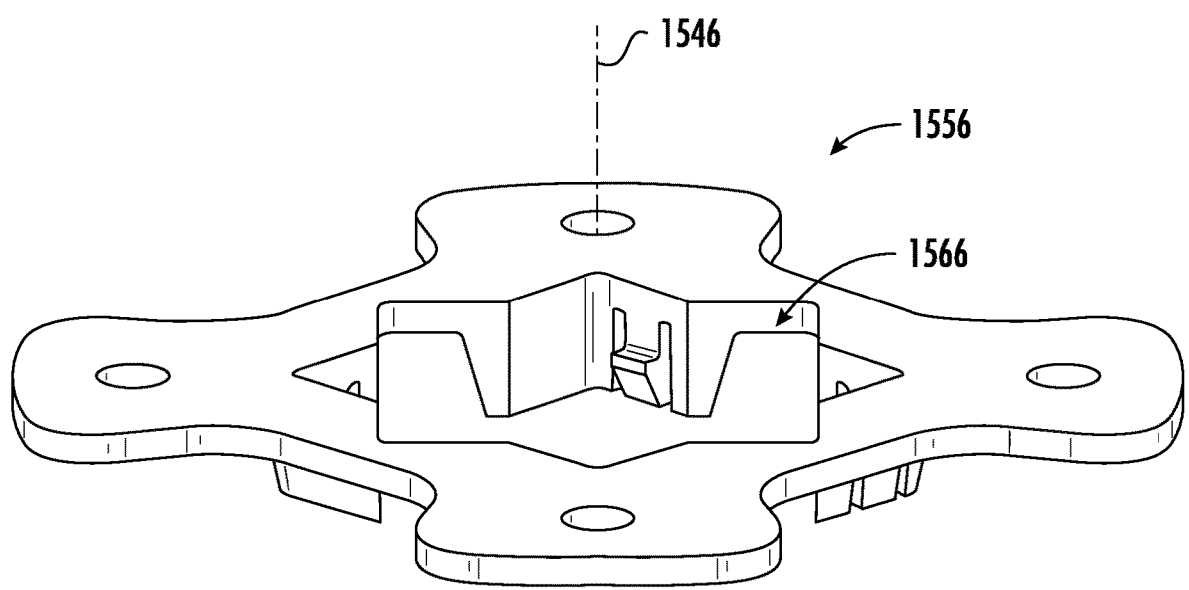
FIG. 22 provides a perspective view of a first lifter plate for the accessory device of FIG. 15 in accordance with aspects of the present disclosure.
Figure 23:
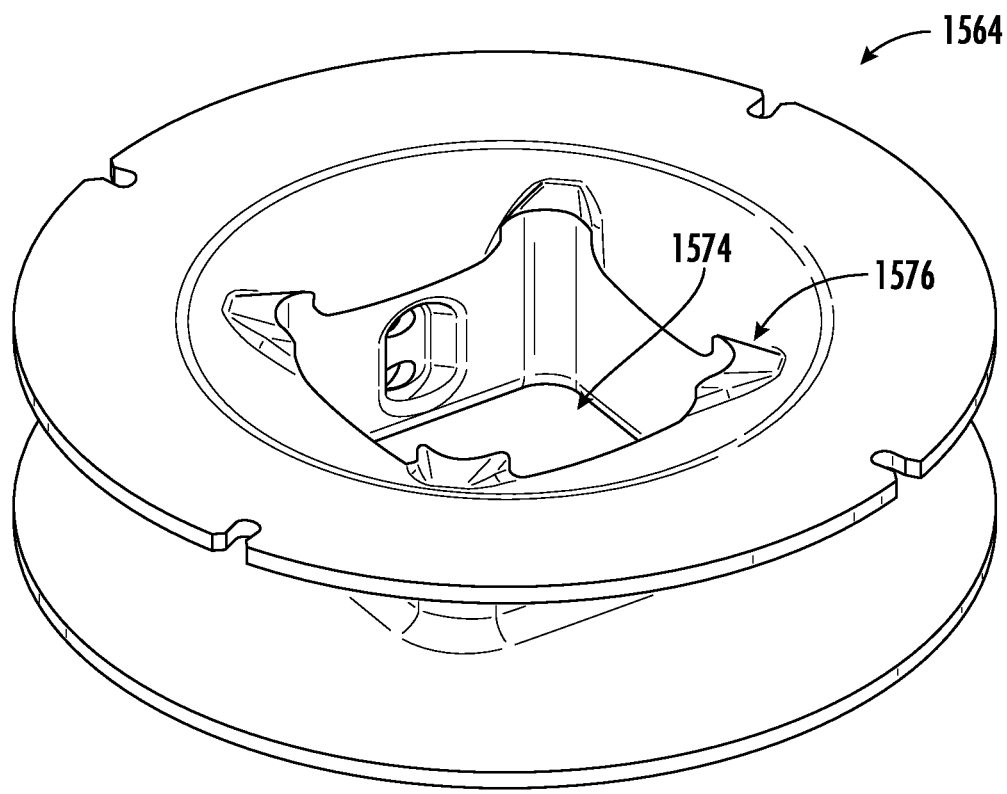
FIG. 23 provides a perspective view of a second lifter plate for the accessory device of FIG. 15 in accordance with aspects of the present disclosure.
Figure 24:
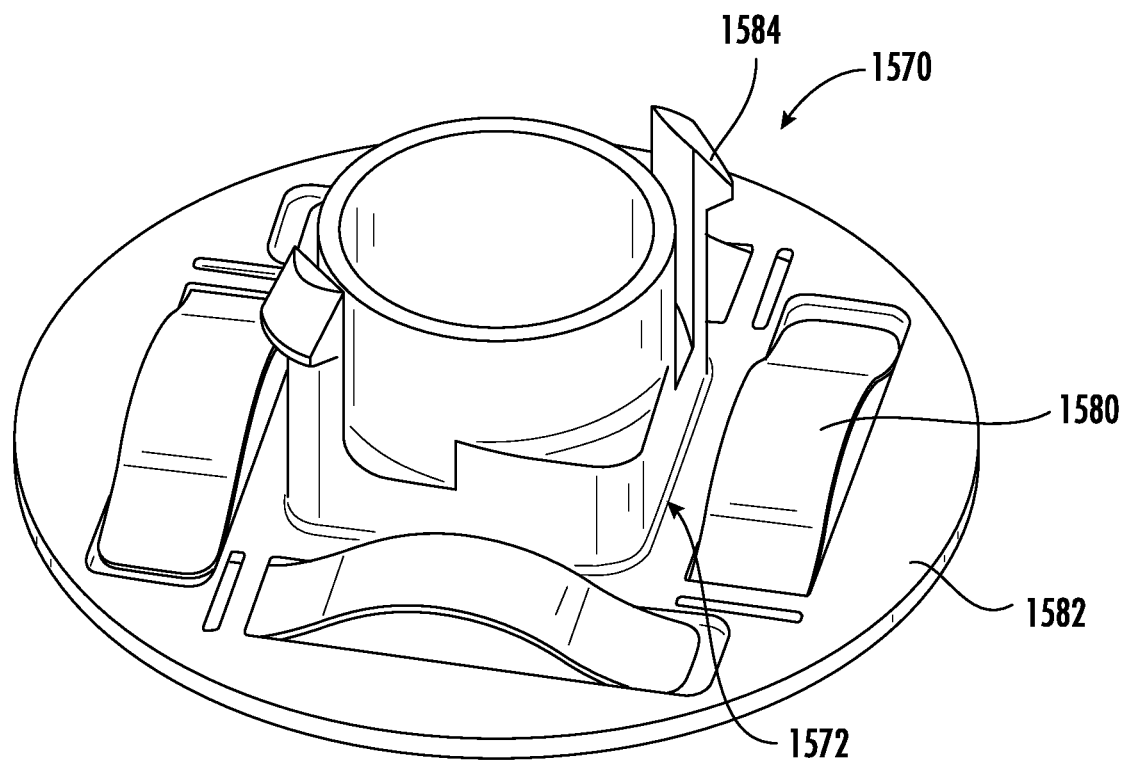
FIG. 24 provides a perspective view of a second lift plate for the accessory device of FIG. 15 in accordance with aspects of the present disclosure.
Figure 25:
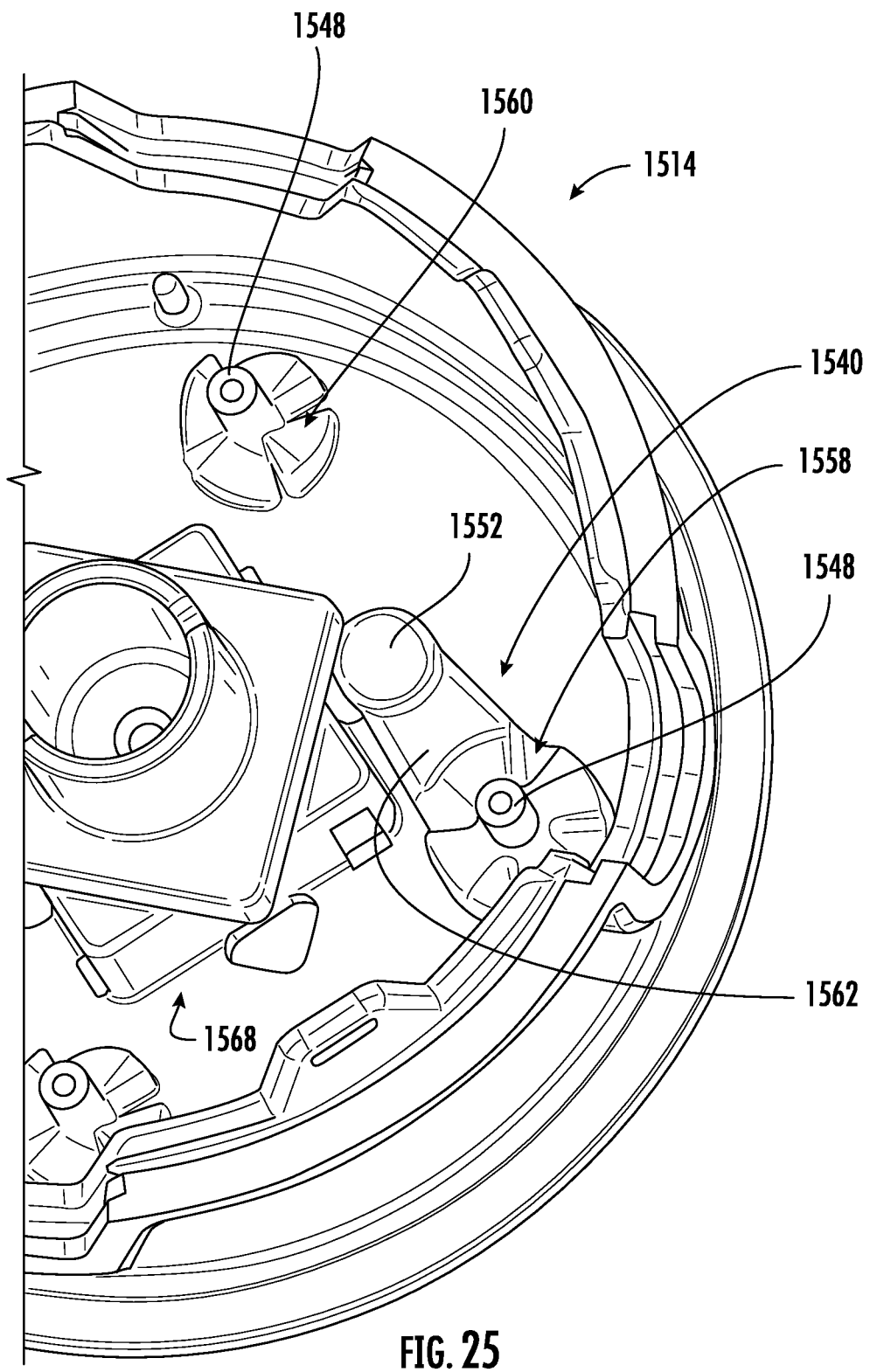
FIG. 25 provides a top view of a portion of a housing of the accessory device of FIG. 15 including a rotating lifter in accordance with aspects of the present disclosure.
Figure 26:
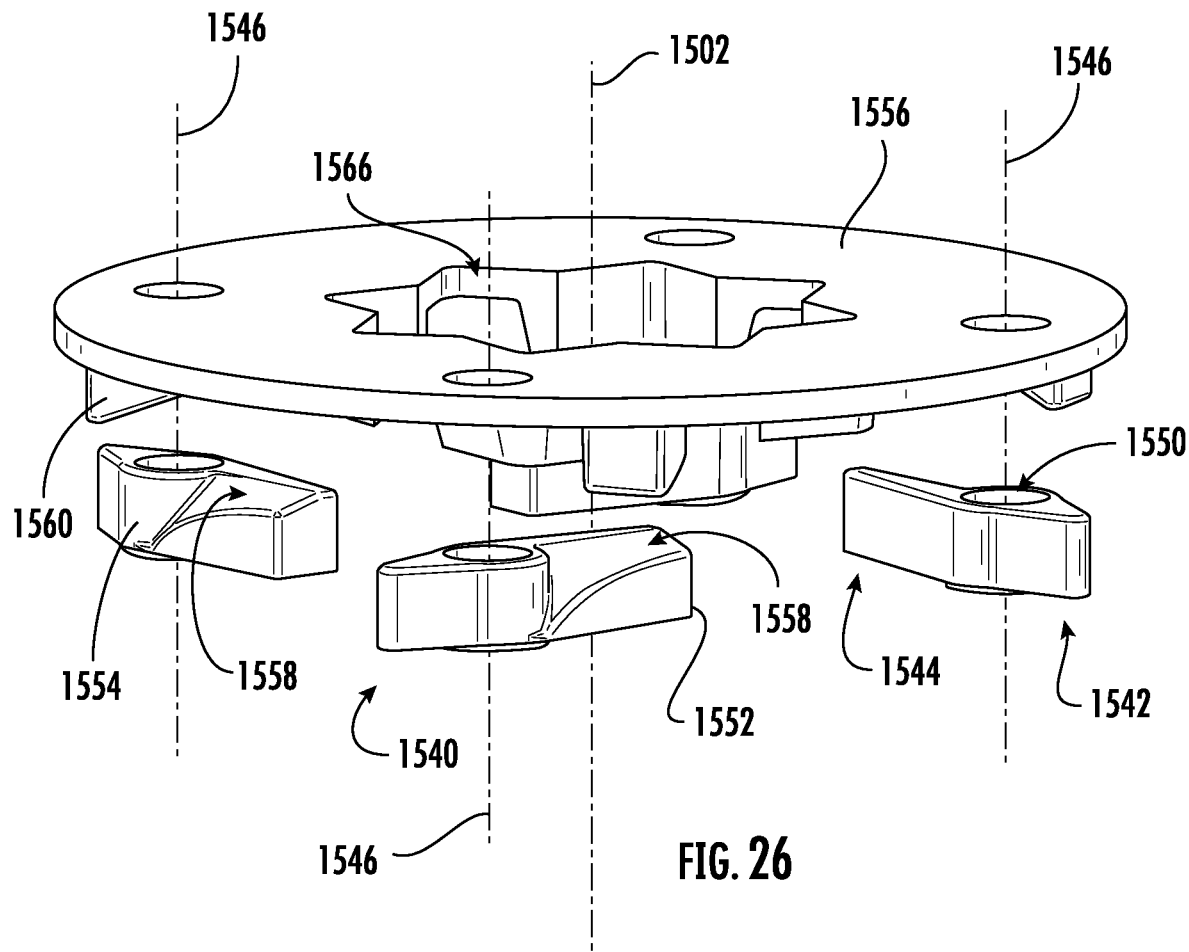
FIG. 26 provides an exploded view of a lifter plate and rotating liters for the accessory device of FIG. 15 in accordance with aspects of the present disclosure.
Figure 27:
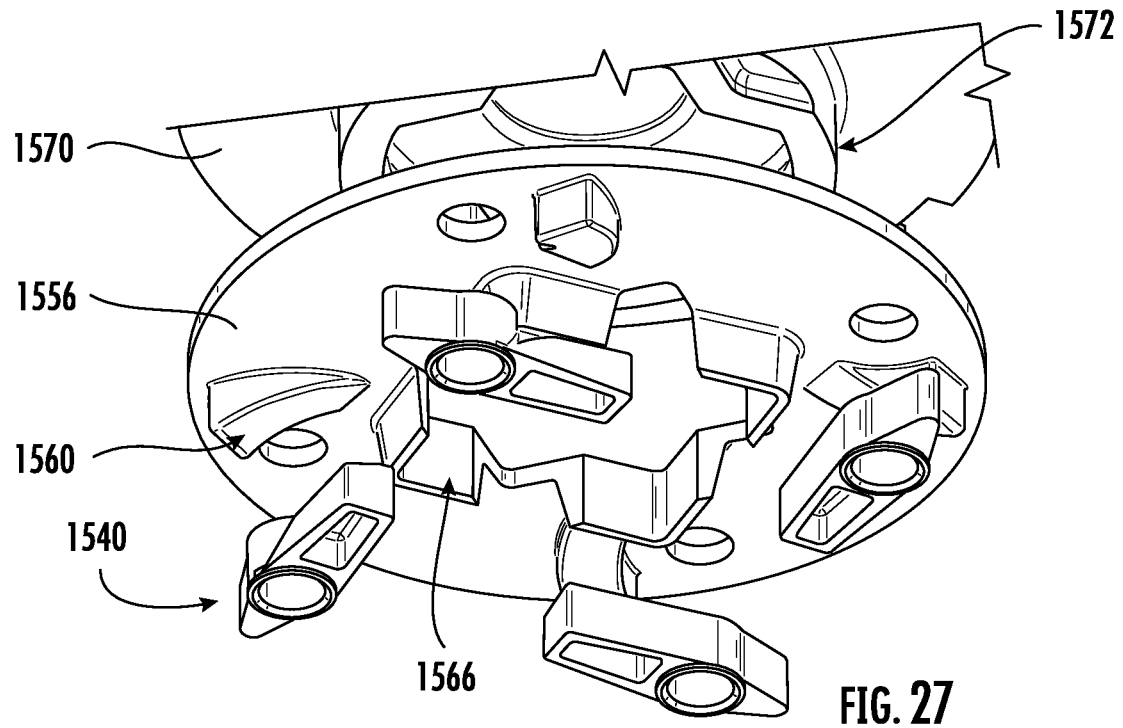
FIG. 27 provides an exploded perspective view of a lifter plate and rotating lifters for the accessory device of FIG. 15 in accordance with aspects of the present disclosure.

FIGS. 17 and 18 provide exploded views of exemplary components of an embodiment of the device 1500 in accordance with aspects of the present disclosure. The top cover 1516 is configured to receive, hold, or affix a retainer housing 1518 onto the top cover 1516. For instance, a fastener 1520 (e.g., a threaded member generally, such as a screw, bolt, or other appropriate device) is extendable through the top cover 1516 and into the retainer housing 1518. The retainer housing 1518 may include a post or body 1522 at which the fastener 1520 is received.

Low speed locks may include simple cantilevered snaps into the top cover 1516 and holding the housing 1514 in place until approximately a rotational speed threshold (e.g., approximately 700 RPM). At and above the rotational speed threshold hold (e.g., approximately 700 RPM), weighted lugs 1524 slide out (e.g., outward along direction 1504 from axis 1502) and engage geometry protruding from the housing 1514 (e.g., end 1526 at lug 1524 selectively engages opening 1528 at housing 1514). The lug 1524 slides substantially or completely straight out (e.g., along direction 1504 from axis 1502) due to centrifugal force. For instance, the magnitude of centrifugal force may correspond to the rotational speed threshold. When the trimmer slows down (e.g., down toward the first speed threshold, e.g., toward 700 RPM and below) the lugs 1524 retract under spring force (e.g., retract toward axis 1502) from a spring 1530.

In various embodiments, the lugs 1524 are any appropriate material configured with mass to compress the spring 1530 (e.g., the spring 1530 may be configured as a return spring). The retainer housing 1518 holds the lugs 1524 and return springs 1530 in position. In various embodiments, the lug 1524 may include a body forming an opening 1532 through which the spring 1530 is positioned and compressible. For instance, fastener 1520 may extend through the lug 1524 and the retainer housing 1518 to hold the lugs 1524 and return springs 1530 in position at the retainer housing 1518.

Recesses in the top cover 1516 snap the lower housing 1514 into place. The retainer housing 1518 holds at least a portion of a fastener 1534 (e.g., flanged nut, such as an arbor nut, having a left-hand thread or right hand thread). For instance, the retainer housing 1518 may include a fastener opening 1536 at which a portion of the fastener 1534 is receivable. The top cover 1516 is configured to hold another portion of the fastener 1534. For instance, the top cover 1516 may include a fastener opening 1538 at which a portion of the fastener 1534 is receivable. In various instances, the top cover 1516 is configured to receive and contact an upper portion of the fastener 1534 at the fastener opening 1538, and the retainer housing 1518 is configured to receive and contact a lower portion of the fastener 1534 at the fastener opening 1536. The top cover 1516 and retainer housing 1518 each holding a portion of the fastener 1534 may allow for reducing a height of the fastener.

FIGS. 19 to 27 provide perspective views of exemplary components of an embodiment of the device 1500 in accordance with aspects of the present disclosure. In various embodiments, the device 1500 includes a rotating lifter 1540. The rotating lifter 1540 has a first end 1542 separated from a second end 1544. The rotating lifter 1540 is configured to rotate about an axis 1546. The axis 1546 may generally be off-center from axis 1502, or extending co-directional to axis 1502. The rotating lifter 1540 may rotate out (e.g., along axis 1546) at a similar speed as other lifters (e.g., rocking lifters). The axis 1546 may generally extend through the first end 1542 of the rotating lifter 1540. For instance, a fastener 1548 (e.g., a rod, a threaded shank, or other coupling device allowing for rotation along axis 1546) may extend through an opening 1550 extending through the rotating lifter 1540. In some embodiments, the rotating lifter 1540 includes a weighted end 1552 at the second end 1544. For instance, the weighted end 1552 may be separated from the first end 1542 or otherwise distal to axis 1546.

In various embodiments, the first end 1542 includes a body 1554 forming the opening 1550 extending along axis 1546 and configured to receive a post, rod, or fastener (e.g., fastener 1548) along axis 1546. Fastener 1548 may extend from a first lifter plate 1556, such as from a bottom side. In some embodiments, a helical ramp 1558 is formed at the body 1554. The lifter plate 1556 may include a corresponding ramp 1560 configured to receive the helical ramp 1558. The helical ramp 1558 provides a surface at which to push a lifter plate assembly upward (e.g., toward end 1506). For instance, the helical ramp 1558 may be positioned at the body 1554. For instance, the helical ramp 1558 may extend at the body 1554 around axis 1546. In another instance, the rotating lifter 1540 may include an arm 1562 extending between the first end 1542 and the second end 1544. The helical ramp 1558 may be formed at the arm 1562.

The lifter plate assembly may include a first lifter plate 1556 at which rotating lifters 1540 are attachable to rotate along axis 1546. The first lifter plate 1556 may snap onto a center post at a second lifter plate 1564 and ride up lifter rails. In some embodiments, rails, posts, or fasteners 1548 may extend from the first lifter plate 1556, such as at which the rotating lifter 1540 may be coupled as depicted and described herein. In some embodiments, the rotating lifter 1540 may include the weighted end 1552 at the helical ramp 1558. The weighted end 1552 may rest or abut against a bottom plane of the first lister plate 1556, such as at ramp 1560. The ramp 1558 at the rotating lifter 1540 contacts the ramp 1560 at the first lifter plate 1556 when the lifter plate assembly rotates, such as may allow for on the rotating lifter 1540 to push upward directly at the first lifter plate 1556 (e.g., at the bottom plane) and actuate the feeding mechanism.

In still various embodiments, a plurality of lugs is included. For instance, the device 1500 may include four lugs, or six or fewer lugs. However, it should be appreciated that any appropriate quantity of lugs may be included. The device 1500 may include a polygonal interface profile (e.g., a square profile, a star profile, a double-square or multi-point start, a rectangular profile, etc.) at which a plurality of components is attached to one another. For instance, the first lifter plate 1556 may form a polygonal opening 1566 along a center portion of the first lifter plate 1556. The opening 1566 is configured to attach to a corresponding center post 1568 at the housing 1514. A second lifter plate 1570 may form a polygonal center post 1572 configured to attach to a corresponding opening 1574 at a cartridge 1576. The second lifter plate 1570 may further extend around a center body 1578 extending along from the center post 1568. Polygonal openings on the carrier keep the cartridge alignment with eyelets similar to devices with greater quantities of lugs and positioning features. Springs 1580 in the lifter plate 1570 may be molded in plastic features, or may include leaf springs, or another appropriate type of spring extending from the lifter plate (e.g., extending along direction 1502 from a platform 1582 at the lifter plate 1570 extending along the second direction 1504).

Retention of a cartridge 1576 may be performed via snaps instead of retainers, such as allowing for space for other features described herein, such as desired lifting height when ejecting the cartridge. For instance, lifter plate 1570 may include a clip, snap, or other attachment interface 1584 configured to selectively engage the cartridge 1576 at a corresponding attachment interface 1586.

An aspect of the present disclosure is directed to methods for operating a power tool and trimmer head. Embodiments of the method include increasing voltage to a brushed motor to increase the motor shaft revolutions per minute (RPM) and trigger lifting and feeding of line. For instance, embodiments of the method include temporarily increasing voltage to a motor to increase the motor shaft RPM and cause lifting and feeding of the line.

Figure 28:
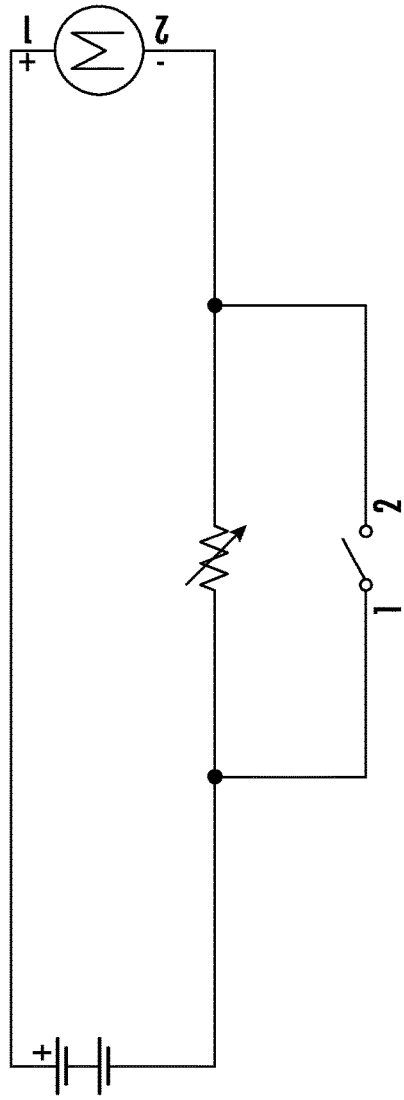
FIG. 28 provides an example circuit diagram of an embodiment of an accessory device in accordance with aspects of the present disclosure.

FIG. 28 depicts an exemplary circuit diagram for embodiments of the device 1500, or embodiments of a power tool operably coupled to embodiments the device 1500, in accordance with aspects of the present disclosure. In some embodiments, during normal operation, motor rotation (e.g., motor RPM) is controlled by a variable resistor. A normally open switch is closed, which bypasses the variable resistor and increases voltage to the motor. For instance, "normal operation" may include operation of the trimmer head or power tool to cut or trim (e.g., cutting or trimming grass, weeds, flora generally, etc.).

Figure 29:
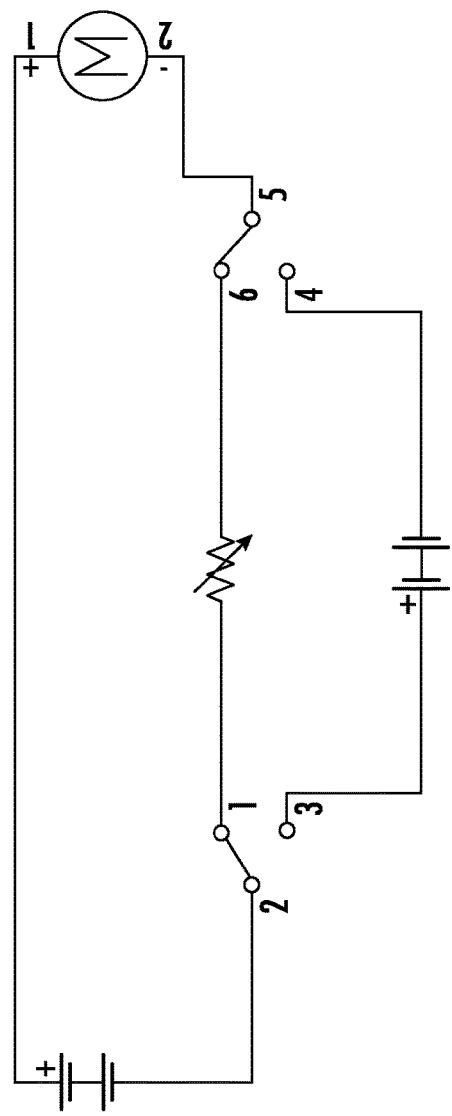
FIG. 29 provides an example circuit diagram of an embodiment of an accessory device in accordance with aspects of the present disclosure.

FIG. 29 depicts an exemplary circuit diagram for embodiments of the device 1500, or embodiments of a power tool operably coupled to embodiments the device 1500, in accordance with aspects of the present disclosure. In still some embodiments, during normal operation, the motor RPM is controlled by a variable resistor. The circuit includes a plurality of batteries. In various embodiments, the circuit includes a first battery forming a main battery (Battery A) and a second battery forming a secondary battery (Battery B). During normal operation, Battery B is disconnected from the circuit by two double throw switches (e.g., a first switch before Battery B and a second switch after Battery B). To feed line, the two switches (first and second switches) are closed, bypassing the variable resistor, putting Battery B in series with Battery A, and increasing the voltage to the motor. In some embodiments, relays, transistors, mosfets, etc. can be used as switching mechanisms. In still some embodiments, Battery B can include a supercapacitor (e.g., Skeleton SuperBattery) to achieve a momentary increase in voltage.

Embodiments of the method provided herein may include increasing rotational speed of the trimmer head (e.g., device 1500) above a threshold rotational speed, such as by increasing voltage to the motor. The threshold rotational speed may correspond to a threshold force. At or beyond the threshold rotational speed, centrifugal force at the rotating lifter increases to cause the rotating lifter to rotate along axis 1546. Force exerted by the rotating lifter onto the lifter plate causes the lifter plate to translate (e.g., along the first direction 1502, such as toward the first end 1506). In some embodiments, decrease or discontinuation of forces exerted by the rotating lifter onto the lifter plate allows the lifter plate to translate along the first axis toward the second end 1508. For instance, decrease or discontinuation of the voltage increase may allow RPM and force to decrease and reduce the force exerted by the rotating lifter onto the lifter plate to allow the lifter plate to translate along the first direction toward the second end 1508 when the rotational speed of the device 1500 is below the threshold rotational speed.

Figure 30:
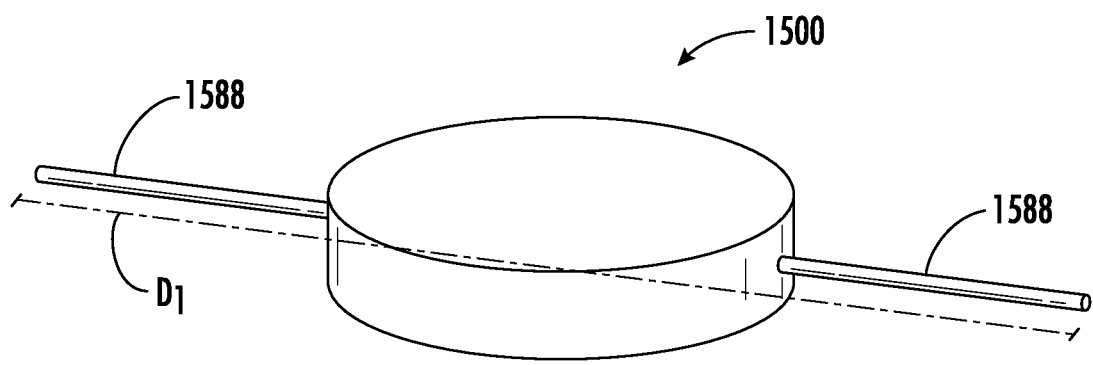
FIG. 30 provides a simplified view of the accessory device in a first state in accordance with aspects of the present disclosure.
Figure 31:
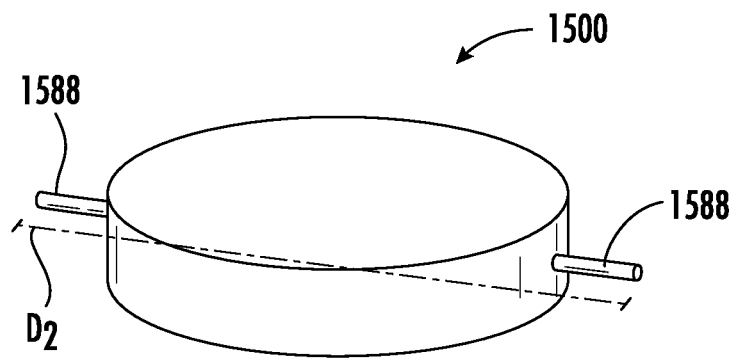
FIG. 31 provides a simplified view of the accessory device in a second state different than the first state in accordance with aspects of the present disclosure.

In various embodiments, methods for auto feed or power feed hybrid operation may allow the feed mechanism to be tuned such that when a swath diameter is smaller than a threshold diameter, the device can be triggered by use of the throttle trigger. When the user wears the line down very short (e.g., depicted at diameter $D_2$ in FIG. 31), the line will automatically feed out under normal usage motor speeds without the user having to deliberately feed the line (e.g., without speed or power increase). When the swath diameter is above the threshold diameter (e.g., depicted at diameter $D_1$ in FIG. 30), a line (e.g., line 1588) will not feed under normal throttle speeds, and the user must deliberately press a "feed" button to feed the line (e.g., increased voltage causing increased RPM). The feed button will increase the motor RPM above what the throttle input is capable of at the larger swath (e.g., the threshold rotational speed) and trigger the feed mechanism.

For instance, a reduction in cutting swath diameter reduces moment of inertia (I) and causes the trimmer head to rotate (and accelerate) faster for a given power (P) input relative to a larger swath diameter. When the swath diameter is small (i.e., below the threshold diameter), the head can spin fast enough (e.g., at angular velocity ω) to trigger the feed under power available with the throttle. When the swath diameter is large (e.g., at or above the threshold diameter), a higher power setting is needed to reach the necessary RPM to feed the line.

The present disclosure may further be directed to a power tool including a trimmer head, such as including embodiments of the housing described herein. The power tool may include a power source, such as a battery, an electrical outlet, or liquid and/or gaseous fuel.

Embodiments of the power tool may include a handle disposed along a connecting member, a housing, or another portion of the power tool. The handle can allow the operator to support the weight of the power tool during operation. A grip can be disposed along the connecting member to permit a second point of contact for the operator. The grip can include, for example, a portion of the connecting member including a user interface. The user interface can include a trigger that allows the operator to selectively control the power tool, such as to provide or increase output voltage such as described herein. The user interface can further include other controls which permit the operator to effect change to the power tool. For instance, by way of non-limiting example, the user interface may include any one or more of a cruise control feature allowing the operator to maintain the operating speed of the trimmer head, a turbo which allows the power tool to reach full operational speed, a power switch having at least ON and OFF functionality, a safety, or any other desirable user controls. The user interface can include a trimmer line advance interface configured to selectively feed trimmer line from the cartridge when actuated.

Embodiments of the method provided herein may include steps, functions, or operations such as depicted and described herein in regard to either device. Some embodiments of the method may include methods for operating a trimmer tool to selectively egress wire or line from a trimmer head. Methods may include methods for operating a spool to selectively egress wire or line from an accessory mount device. It should be appreciated that embodiments of the device and method provided herein may be applied generally to wire or line feed spool devices positioned within rotatable structures.

Further aspects of the invention are provided by one or more of the following embodiments:

Embodiment 1. An accessory mount device for a power tool, wherein a reference axis forms an axis of rotation of the accessory mount device, the accessory mount device comprising: a housing forming an interior volume, the housing comprising a ramped surface in the interior volume at which a bearing is positioned; a first plate forming a channel at which the bearing is positioned at the ramped surface to push the first plate along the reference axis; a second plate configured to push a spool in the direction of the reference axis, wherein the bearing is configured to selectively push the first plate to the second plate when a centrifugal force threshold is exceeded, and wherein the second plate is allowed to rotate around the reference axis separate from the first plate.

Embodiment 2. The accessory mount device of embodiment 1, comprising a plurality of bearings, wherein the plurality of bearings are evenly distributed circumferentially relative to the reference axis.

Embodiment 3. The accessory mount device of any one of embodiments 1 or 2, comprising a plurality of pairs of bearings.

Embodiment 4. The accessory mount device of any one of embodiments 1 to 3, comprising a spring extending in the direction of the reference axis between the spool and the second plate, the spring configured to bias the second plate toward the first plate.

Embodiment 5. The accessory mount device of any one of embodiments 1 to 4, comprising a spring in the direction of the reference axis between the second plate and a top wall.

Embodiment 6. The accessory mount device of embodiment 5, the spring configured to react against movement of the second plate along the reference axis toward the top wall.

Embodiment 7. The accessory mount device of any one of embodiments 1 to 6, the second plate comprising an opening formed between an outer perimeter of the second plate and an inner wall of the housing, wherein a tab is configured to extend into the opening to limit rotation of the second plate.

Embodiment 8. The accessory mount device of embodiment 7, wherein the bearing is configured to selectively push the first plate to the second plate when the centrifugal force threshold is exceeded, and wherein the second plate is allowed to rotate along the reference axis when the first plate raises the second plate above the tab along the reference axis.

Embodiment 9. The accessory mount device of any one of embodiments 1 to 8, comprising a carrier assembly forming a bayonet type locking mechanism configured to align a lug at the spool with a channel at a carrier.

Embodiment 10. The accessory mount device of embodiment 9, comprising a spring positioned and retained at the locking mechanism to bias the spool along the reference axis toward a top wall.

Embodiment 11. The accessory mount device of embodiment 10, wherein biasing the spool toward the top wall positions the lug into a pocket formed at the carrier when in a first rotational position.

Embodiment 12. The accessory mount device of embodiment 11, wherein biasing the spool toward the top wall positions the lug into the channel formed at the carrier when in a second rotational position.

Embodiment 13. The accessory mount device of embodiment 9, wherein the channel extends from an upper flange along the reference axis at the carrier to form an open channel, and wherein the channel extends along a circumferential direction to form a pocket comprising a closed lower flange along the reference axis.

Embodiment 14. The accessory mount device of embodiment 13, wherein the lug positioned in the pocket prevents vertical or rotational movement of the cartridge relative to the second plate during rotation of the accessory mount device.

Embodiment 15. An accessory mount device for a power tool, wherein a reference axis forms an axis of rotation of the accessory mount device, the accessory mount device comprising: a first plate forming a channel at which a bearing is positioned at a ramped surface to push a first plate along the reference axis; a second plate configured to push a spool along the reference axis; a housing surrounding the first and second plates; and a carrier forming a bayonet type locking mechanism configured to align a lug at the spool with a channel at the carrier.

Embodiment 16. The accessory mount device of embodiment 15, comprising a spring positioned and retained at the locking mechanism to bias the spool along the reference axis toward a top wall.

Embodiment 17. The accessory mount device of embodiment 16, wherein biasing the spool toward the top wall positions the lug into a pocket formed at the carrier when in a first rotational position.

Embodiment 18. The accessory mount device of embodiment 17, wherein biasing the spool toward the top wall positions the lug into the channel formed at the carrier when in a second rotational position.

Embodiment 19. The accessory mount device of embodiment 15, wherein the channel extends from an upper flange along the reference axis at the carrier to form an open channel, and wherein the channel extends along a circumferential direction to form a pocket comprising a closed lower flange along the reference axis.

Embodiment 20. The accessory mount device of embodiment 19, wherein the lug positioned in the pocket prevents vertical or rotational movement of the cartridge relative to the second plate during rotation of the accessory mount device.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An accessory mount device for a power tool, wherein a reference axis forms an axis of rotation of the accessory mount device, the accessory mount device comprising:
   a housing forming an interior volume, the housing comprising a ramped surface in the interior volume at which a bearing is positioned;
   a first plate forming a channel at which the bearing is positioned at the ramped surface to push the first plate along the reference axis; and
   a second plate configured to push a spool in a direction of the reference axis, wherein the bearing is configured to selectively push the first plate to the second plate when a centrifugal force threshold is exceeded, and wherein the second plate is allowed to rotate around the reference axis separate from the first plate.

2. The accessory mount device of claim 1, comprising a plurality of bearings, wherein all of the plurality of bearings are evenly distributed circumferentially relative to the reference axis.

3. The accessory mount device of claim 1, comprising a plurality of pairs of bearings.

4. The accessory mount device of claim 1, comprising a spring extending in the direction of the reference axis between the spool and the second plate, the spring configured to bias the second plate toward the first plate.

5. The accessory mount device of claim 1, comprising a spring oriented in the direction of the reference axis between the second plate and a top wall.

6. The accessory mount device of claim 5, the spring configured to react against movement of the second plate along the reference axis toward the top wall.

7. The accessory mount device of claim 1, the second plate comprising an opening formed between an outer perimeter of the second plate and an inner wall of the housing, wherein a tab is configured to extend into the opening to limit rotation of the second plate.

8. The accessory mount device of claim 7, wherein the bearing is configured to selectively push the first plate to the second plate when the centrifugal force threshold is exceeded, and wherein the second plate is allowed to rotate along the reference axis when the first plate raises the second plate above the tab along the reference axis.

9. The accessory mount device of claim 1, comprising a carrier assembly forming a bayonet type locking mechanism configured to align a lug at the spool with a channel at a carrier.

10. The accessory mount device of claim 9, comprising a spring positioned and retained at the locking mechanism to bias the spool along the reference axis toward a top wall.

11. The accessory mount device of claim 10, wherein biasing the spool toward the top wall positions the lug into a pocket formed at the carrier when in a first rotational position.

12. The accessory mount device of claim 11, wherein biasing the spool toward the top wall positions the lug into the channel formed at the carrier when in a second rotational position.

13. The accessory mount device of claim 9, wherein the channel extends from an upper flange along the reference axis at the carrier to form an open channel, and wherein the channel extends along a circumferential direction to form a pocket comprising a closed lower flange along the reference axis.

14. The accessory mount device of claim 13, wherein the lug positioned in the pocket prevents vertical or rotational movement of the spool relative to the second plate during rotation of the accessory mount device.

15. An accessory mount device for a power tool, wherein a reference axis forms an axis of rotation of the accessory mount device, the accessory mount device comprising:
- a first plate forming a channel at which a bearing is positioned at a ramped surface to push a first plate along the reference axis;
- a second plate configured to push a spool along the reference axis;
- a housing surrounding the first and second plates; and
- a carrier forming a bayonet type locking mechanism configured to align a lug at the spool with a channel at the carrier.

16. The accessory mount device of claim 15, comprising a spring positioned and retained at the locking mechanism to bias the spool along the reference axis toward a top wall.

17. The accessory mount device of claim 16, wherein biasing the spool toward the top wall positions the lug into a pocket formed at the carrier when in a first rotational position.

18. The accessory mount device of claim 17, wherein biasing the spool toward the top wall positions the lug into the channel formed at the carrier when in a second rotational position.

19. The accessory mount device of claim 15, wherein the channel extends from an upper flange along the reference axis at the carrier to form an open channel, and wherein the channel extends along a circumferential direction to form a pocket comprising a closed lower flange along the reference axis.

20. The accessory mount device of claim 19, wherein the lug positioned in the pocket prevents vertical or rotational movement of the spool relative to the second plate during rotation of the accessory mount device.

* * * * *